United States Patent
Blangero et al.

(10) Patent No.: US 11,811,061 B2
(45) Date of Patent: *Nov. 7, 2023

(54) POSITIVE ELECTRODE MATERIALS HAVING A SUPERIOR HARDNESS STRENGTH

(71) Applicants: Umicore, Brussels (BE); Umicore Korea Ltd., Chungnam (KR)

(72) Inventors: Maxime Blangero, Cheonan (KR); Da-In Choi, Cheonan (KR); WooRam Cho, Gyeonggi-do (KR); JiHye Kim, Dujeong-dong (KR)

(73) Assignees: UMICORE, Brussels (BE); UMICORE KOREA, LTD., Chungnam (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/718,515

(22) Filed: Apr. 12, 2022

(65) Prior Publication Data

US 2022/0255075 A1    Aug. 11, 2022

Related U.S. Application Data

(63) Continuation of application No. 17/019,626, filed on Sep. 14, 2020, now Pat. No. 11,335,907, which is a
(Continued)

(30) Foreign Application Priority Data

Jun. 10, 2014  (EP) ..................... 14171694

(51) Int. Cl.
*H01M 4/525*     (2010.01)
*H01M 4/505*     (2010.01)
(Continued)

(52) U.S. Cl.
CPC ............ *H01M 4/525* (2013.01); *C01G 53/42* (2013.01); *C01G 53/50* (2013.01); *H01M 4/505* (2013.01);
(Continued)

(58) Field of Classification Search
CPC ..... C01G 53/42; C01G 53/50; C01P 2002/72; C01P 2004/03; C01P 2004/51;
(Continued)

(56) References Cited

U.S. PATENT DOCUMENTS 6,794,085 B2    9/2004   Gao et al.
2003/0022063 A1  1/2003   Paulsen et al.
(Continued)

FOREIGN PATENT DOCUMENTS

CN    101595581 A   12/2009
CN    102593442 A    7/2012
(Continued)

OTHER PUBLICATIONS

WIPO Machine Translation CN 102593442 (Year: 2012).
(Continued)

*Primary Examiner* — Victoria H Lynch
(74) *Attorney, Agent, or Firm* — NK Patent Law

(57) ABSTRACT

A powderous positive electrode material for a lithium secondary battery has the general formula $Li_{1+x}[Ni_{1-a-b-c}M_aM'_bM''_c]_{1-x}O_{2-z}$. M is one or more elements of the group Mn, Zr and Ti. M' is one or more elements of the group Al, B and Co. M" is a dopant different from M and M', and x, a, b and c are expressed in mol with $-0.02 \leq x \leq 0.02$, $0 \leq c \leq 0.05$, $0.10 \leq (a+b) \leq 0.65$ and $0 \leq z \leq 0.05$. The material has an unconstrained cumulative volume particle size distribution value ($\Gamma^0(D10_{P=0})$), a cumulative volume particle size distribution value after having been pressed at a pressure of 200 MPa ($\Gamma^P(D10_{P=200})$) and a
(Continued)

cumulative volume particle size distribution value after having been pressed at a pressure of 300 MPa ($\Gamma^P$ ($D10_{P=300}$)). When $\Gamma^P(D10_{P=200})$ is compared to $\Gamma^0(D10_{P=0})$, the relative increase in value is less than 100%. When $\Gamma^P(D10_{P=300})$ is compared to $\Gamma^0(D10_{P=0})$, the relative increase in value is less than 120%.

17 Claims, 15 Drawing Sheets

Related U.S. Application Data continuation of application No. 15/317,161, filed as application No. PCT/IB2015/054146 on Jun. 1, 2015, now Pat. No. 10,833,328.

(51) Int. Cl.

| | |
|---|---|
| *C01G 53/00* | (2006.01) |
| *H01M 10/0525* | (2010.01) |
| *H01M 4/1391* | (2010.01) |
| *H01M 10/052* | (2010.01) |
| *H01M 4/131* | (2010.01) |
| *H01M 4/02* | (2006.01) |

(52) U.S. Cl.
CPC ..... *H01M 10/0525* (2013.01); *C01P 2002/72* (2013.01); *C01P 2004/03* (2013.01); *C01P 2004/51* (2013.01); *C01P 2004/61* (2013.01); *C01P 2006/10* (2013.01); *C01P 2006/12* (2013.01); *C01P 2006/16* (2013.01); *C01P 2006/40* (2013.01); *H01M 4/131* (2013.01); *H01M 4/1391* (2013.01); *H01M 10/052* (2013.01); *H01M 2004/028* (2013.01)

(58) Field of Classification Search
CPC .............. C01P 2004/61; C01P 2006/10; C01P 2006/12; C01P 2006/16; C01P 2006/40; H01M 10/052; H01M 10/0525; H01M 2004/028; H01M 4/131; H01M 4/1391; H01M 4/505; H01M 4/525; Y02E 60/10
See application file for complete search history.

(56) References Cited

U.S. PATENT DOCUMENTS

| | | |
|---|---|---|
| 2004/0023113 A1 | 2/2004 | Suhara et al. |
| 2004/0120192 A1 | 6/2004 | Kitagawa et al. |
| 2006/0233696 A1 | 10/2006 | Paulsen et al. |
| 2009/0314985 A1 | 12/2009 | Malcus et al. |
| 2010/0112447 A1 | 5/2010 | Yamamoto et al. |
| 2010/0117025 A1 | 5/2010 | Takeuchi et al. |
| 2011/0193013 A1 | 8/2011 | Paulsen et al. |
| 2011/0260099 A1 | 10/2011 | Paulsen et al. |
| 2013/0004849 A1 | 1/2013 | Satoh |
| 2013/0011726 A1 | 1/2013 | Takano et al. |
| 2014/0054495 A1 | 2/2014 | Paulsen et al. |
| 2014/0114519 A1 | 4/2014 | Iwama et al. |
| 2015/0056511 A1 | 2/2015 | Takamatsu et al. |
| 2015/0093641 A1 | 4/2015 | Mitsumoto et al. |

FOREIGN PATENT DOCUMENTS

| | | |
|---|---|---|
| CN | 102754254 A | 10/2012 |
| JP | 2004199778 A | 7/2004 |
| JP | 2004342548 A | 12/2004 |
| JP | 2005026141 A | 1/2005 |
| JP | 2005196990 A | 7/2005 |
| JP | 2007091573 A | 4/2007 |
| JP | 2008013405 A | 1/2008 |
| JP | 2008166269 A | 7/2008 |
| JP | 2010505732 A | 2/2010 |
| JP | 2012004109 A | 1/2012 |
| JP | 2013129589 | 7/2013 |
| JP | 5313392 B2 | 10/2013 |
| JP | 2014007034 | 1/2014 |
| JP | 2014041710 A | 3/2014 |
| KR | 1020090065527 A | 6/2009 |
| KR | 20110132287 A | 12/2011 |
| TW | 201025708 A | 1/2010 |
| WO | 2008091028 A1 | 7/2008 |
| WO | 2011108389 A1 | 9/2011 |
| WO | 2012107313 | 8/2012 |
| WO | 2013191179 A1 | 12/2013 |

OTHER PUBLICATIONS

EIC Search Results by Searcher Sam Darwish Jun. 19, 2018 (Year: 2018).
Espacenet Machine Translation CN 102593442 (Year: 2012).
TIPO; Office Action for Taiwanese U.S. Appl. No. 14/171,694, including European Search Report for European Patent Application No. 14171694, dated Nov. 13, 2014, 2 pages.
Yoshio, M., et al., "Preparation and Properties of LiCoyMnxNi1-x-yO2 as a Cathode for Lithium Ion Batteries", Journal of Power Sources, vol. 90, (2000), pp. 176-181.
ISA/KR; International Search Report and Written Opinion for International Patent Application No. PCT/IB2015/054146, dated Sep. 4, 2015, 8 pages.
Dahn, et al., "Thermal Stability of LixCoO2, LixNiO2 and MnO2 and Consequences for the Safety of Li-Ion Cells", Solid State Ionics, vol. 69, (1994), pp. 265-270.
Braconnier, J.J., et al., "Comportement Electrochimique des Phases NaxCoO2", Mat. Res. Bull., vol. 15 (1980), pp. 1797-1804 [English abstract provided].
USPTO; Non-Final Office Action for U.S. Appl. No. 15/317,161 dated Mar. 24, 2020, 10 pages.
USPTO; Non-Final Office Action for U.S. Appl. No. 15/317,161 dated Oct. 10, 2019, 15 pages.
USPTO; Non-Final Office Action for U.S. Appl. No. 15/317,161 dated Nov. 8, 2018, 13 pages.
USPTO; Final Office Action for U.S. Appl. No. 15/317,161 dated Apr. 25, 2019, 17 pages.
WIPO; International Preliminary Report on Patentability for International Patent Application No. PCT/IB2015/054146, dated Jun. 17, 2016, 34 pages.
USPTO; Non-Final Office Action for U.S. Appl. No. 17/019,626 dated Sep. 22, 2021, 12 pages.

POSITIVE ELECTRODE MATERIALS HAVING A SUPERIOR HARDNESS STRENGTH

CROSS-REFERENCE TO RELATED APPLICATIONS

This application is a Continuation of U.S. application Ser. No. 17/019,626, filed on Sep. 14, 2020, which is a Continuation application of U.S. application Ser. No. 15/317,161, now issued as U.S. Pat. No. 10,833,328, filed Dec. 8, 2016, which is a National Stage application of International Application No. PCT/IB2015/054146, filed Jun. 1, 2015, which claims priority to European Application No. 14171694.4, filed Jun. 10, 2014.

TECHNICAL FIELD AND BACKGROUND

This invention relates to metal oxide compounds and to preparation methods thereof. More specifically, this invention relates to doped metal oxide insertion compounds for use in lithium and lithium-ion batteries.

In recent years, secondary lithium ion batteries superseded other battery systems due to their relatively high gravimetric and volumetric energy density. These features are particularly desirable to accompany the miniaturization of portable electronics (such as laptops, smartphones or cameras . . . ) and foreseen as suitable for electrical vehicles (HEV or EV) with long operational range. The latter application requires batteries able to sustain good charge-discharge cycle life under real operating conditions, namely several thousand of cycles at over an extended temperature range and high rate of discharge. The majority of rechargeable lithium ion batteries use anode materials which do not contain lithium metal, for example carbon and/or metal alloy (such as silicon alloys, tin alloys . . . ) containing materials. The cathode must then contain lithium which can be reversibly extracted during charge and inserted during discharge in order to deliver good cycle life.

Most promising materials as cathodes for rechargeable lithium ion batteries are lithium transition metal oxides with a layered structure derived from α-NaFeO$_2$ (space group R-3 m). Since the introduction of the first Li-ion battery in 1990 by Sony into consumer electronics; LiCoO$_2$ is still the most commonly used cathode materials thanks to its good cycle life, very high pressed density—commonly exceeding 3.7 g/cm$^3$—and large specific capacity of about 140 mAh/g at 4.2V against graphite anodes. LiCoO$_2$ is however less favored by its very high and fluctuating price and relative scarcity of cobalt, which limits its use for the emerging EV mass-market. Alternative cathode active materials such as LiNiO$_2$ have been investigated due to larger availability and lower price of nickel. LiNiO$_2$ also features a higher specific capacity when compared to LiCoO$_2$, typically exceeding 200 mAh/g at 4.2V, due to the lower potential of the transition metal oxide redox-couple. LiNiO$_2$ has two shortcomings:

(i) LiNiO$_2$ raises safety concerns because it has a sharper exothermic reaction with electrolyte at a lower temperature than LiCoO$_2$, as evidenced by DSC (see Dahn et al, Solid State Ionics, 69, 265 (1994)), ultimately leading to thermal runaway and catastrophic failure of the battery. Accordingly, pure LiNiO$_2$ is generally not selected for use in commercial lithium-ion batteries.

(ii) Higher specific capacity at a given cell voltage means that larger amounts of Li can be reversibly de-intercalated per unit of LiNiO$_2$, leading to significant changes of the crystal volume upon charge and discharge cycling. Such repeated large variations of the crystal volume can lead to cathode materials' primary and secondary particles not being able to sustain such stress. Particle fracture and loss of electrical contact may occur within the electrode and this ultimately impairs the cycle life of the Li-ion battery.

For improving the abovementioned issues, especially the ones related to safety for LiNiO$_2$, various doping elements have been introduced, for example electrochemically inactive ions such as Mg$^{2+}$, Ti$^{4+}$ and Al$^{3+}$ (see for example U.S. Pat. No. 6,794,085 B2). Such a doping strategy however frequently results in a decrease of specific capacity and lower power in real cells, and is not preferred for the end application.

A more promising route is Co and Mn substitution of Ni (as disclosed in US 2003/0022063 A1) leading to a so called NMC-type composition with the idealized general formula Li$_{1+x}$[Ni$_{1-a-b}$Mn$_a$ Co$_b$]$_{1-x}$O$_2$. This idealized formula doesn't expressly take into account cation mixing, which is the ability of a metal, generally nickel in divalent state, to occupy sites in the lithium layers. It is generally admitted that Mn is tetravalent, Co trivalent and Ni bears a 2+/3+ charge. It is trivial to show that the fraction of nickel ions being effectively Ni$^{3+}$ is:

$$\frac{\left(\frac{1+x}{1-x}2a - b\right)}{1-a-b}$$

where $$\frac{1+x}{1-x}$$

is referred to as the lithium to metal molar ratio. The Ni$^{3+}$ molar content is therefore equal to:

$$\left(\frac{1+x}{1-x} - 2a - b\right) \times (1-x).$$

When Li:M is close to 1, meaning that for x~0 (or −0.05≤x≤0.05), the Ni$^{3+}$ molar content approximates 1−2a−b. This last expression will be considered to calculate the effective Ni$^{3+}$ content in the following examples with the convention that "a" represents tetravalent metal cations (examples include—but are not limited to—Mn$^{4+}$, Zr$^{4+}$ or Ti$^{4+}$), and b represents trivalent metal cations (examples include—but are not limited to—Co$^{3+}$ and Al$^{3+}$). Likewise, the calculation of effective Ni$^{3+}$ fraction can be extended to take into account divalent metal cation doping such as Mg$^{2+}$ and Ca$^{2+}$; one can show that the content is given by (1−2a−b)/(1−a−b−c) where c represents the molar content of divalent cations.

In these NMC materials, the specific capacity, hence the amount of Li reversibly de-intercalating from the materials, increases when the effective Ni$^{3+}$ content increases. For example, popular compositions such as 111 (111 standing for the molar ratio of Ni:Mn:Co, with ~0.1 mole Ni$^{3+}$ per mole of product), 532 (~0.2 mole Ni$^{3+}$), 622 (~0.4 mole Ni$^{3+}$) and 811 (~0.7 mole Ni$^{3+}$) typically have a specific discharge capacity of 150, 160, 170 and 190 mAh/g, respectively, when cycled between 4.2 and 2.7V against a graphite anode.

More lithium ions are then reversibly extracted from the materials, resulting in a higher particle strain when the effective $Ni^{3+}$ content is increased. Strain ultimately will lead to particle fracture and electrode degradation, hence accelerating the rate of capacity fading and impairing the cycle life of the cell. In addition, such particle fracture creates new exposed surfaces which will eventually accelerate side reactions on the cathode, namely electrolyte oxidation, and further reduce the cycle life of the battery. Such issues become more critical for systems requiring a higher power output: typically modern EV applications require operating C-rates superior to 1 C and even up to 5 C (1 C=1 h and 5 C=12 mins to complete full battery charging or discharging). Cathode materials must be able to accommodate strain generated by volume change of the unit cell due to insertion and extraction of Li ions in a short amount of time. Clearly, it is difficult to design materials being both able to deliver a large specific capacity (i.e. having high effective $Ni^{3+}$) and able to accommodate larger strain, especially at higher power. It is the object of the present invention to provide such materials.

The volumetric energy density (in Wh/L) of the Li-ion battery is not only influenced by the specific discharge capacity (in mAh/g) of both the anode and cathode electrodes, but also by the gravimetric density of the electrodes (in g/cm$^3$). On the cathode side, the electrode gravimetric density is determined by:
 (i) the intrinsic properties of the cathode materials such as tap density (TD) or pressed density, and,
 (ii) the electrode production process, for example during the calendaring or pressing step to increase electrode density. In such a step, an uniaxial stress is applied to the electrode in order to reach the desired level of density (or porosity) to achieve a high volumetric energy.

The present invention aims at providing a cathode material able to sustain such stress, id est a material with secondary particles that do not break under pressure during the manufacturing process and that are able to sustain repeated charge-discharge cycles without breaking.

In this respect, US 2004/023113 A1 is concerned with the determination of the compressed density and compressive strength of cathode powders; the examples being mostly about LiCoO$_2$. In the determination of the compressed density, the power is compressed under a pressure of 29.4 MPa. Such pressure is about 10-fold lower in comparison to the present state of the art requirements of electrode making and is not representative of the behavior of cathode materials during such process.

It is known that the particular morphology of LiCoO$_2$, with very dense, non-agglomerated potato-shaped particles, can sustain very high compression stress without breaking. Composite lithium nickel manganese cobalt oxides (NMC) have a very different morphology of secondary particles made of agglomeration of primary particles. Such secondary particles are more brittle due to the occurrence of interparticle grain boundaries which are preferred fracture points. Impurities such as un-reacted alkali salts (hydroxides, carbonates, sulfates . . . ) accumulate at the grain boundaries. When the full cell is operated at potentials above 4V, these unreacted salts decompose and dissolve in the electrolyte, leaving the grain boundary opened and unfilled, which dramatically impairs the mechanical resistance of the secondary particles. Materials comprising an excessive amount of such Li-salt impurities demonstrate a lower resistance to mechanical stress resulting from electrode processing, and have an inferior tolerance to accommodate strain resulting for Li insertion and extraction when operated in a battery at high power (=at a high discharge C-rate). It is commonly accepted that the higher the effective $Ni^{3+}$ content, the more impurities, primarily LiOH and Li$_2$CO$_3$, accumulate at the grain boundaries, further increasing the propensity of secondary particles to break.

US 2009/0314985 A1 describes the compressive strength of cathode powders and introduces the concept that the D10 value of the particle size distribution should change by no more than 1 µm after compression of the powder under 200 MPa. Such criterion fails to properly describe the behavior of materials having lower D10 values; especially when D10<1 µm. The only example describes the behavior of a D50=10 µm NMC 111 with +/−5 mol % of $Ni^{3+}$. Because of its low effective $Ni^{3+}$ content NMC 111 is one of the less brittle NMC materials. Materials having a larger effective $Ni^{3+}$ content—and a larger specific capacity—while keeping relatively low secondary particle brittleness are desirable for modern applications. In addition, the manufacturing process disclosed in US 2009/0314985 A1 is not realistic for mass production: it is for example described to use oxygen gas streams and multiple step firing resulting in both high cost and low throughput. In addition, no mention is made on the cycle life improvement of cathode materials featuring an improved hardness strength.

SUMMARY

Viewed from a first aspect, the invention can provide a powderous positive electrode material for a lithium secondary battery, the material having the general formula Li$_{1+x}$[Ni$_{1-a-b-c}$M$_a$M'$_b$M''$_c$]$_{1-x}$O$_{2-z}$;

M being either one or more elements of the group Mn, Zr and Ti,

M' being either one or more elements of the group Al, B and Co,

M'' being a dopant different from M and M', x, a, b and c being expressed in mol with −0.02≤x≤0.02, 0≤c≤0.05, 0.10≤(a+b)≤0.65 and 0≤z≤0.05; and wherein the powderous material is characterized by having a BET value ≤0.37 m$^2$/g, a D$_{max}$<50 µm, and wherein the powderous material is characterized by having a hardness strength index (HSI) Δ Γ(P) value of no more than 100%+(1−2a−b)×160% for P=200 MPa, wherein $$\Delta\Gamma(P) = \frac{\Gamma^P(D10_{P=0}) - \Gamma^0(D10_{P=0})}{\Gamma^0(D10_{P=0})} \times 100 \text{ (in \%)}$$

with D10$_{P=0}$ being the D10 value of the unconstrained powder (P=0 MPa), Γ$^0$(D10$_{P=0}$) being the cumulative volume particle size distribution of the unconstrained powder at D10$_{P=0}$, and Γ$^P$(D10$_{P=0}$) being the cumulative volume particle size distribution at D10$_{P=0}$ of the pressed samples with P being expressed in MPa. In an embodiment, M=Mn and M' is either one of Al and Co. In another embodiment Dmax<45 µm. From the experiments below it is clear that a value for BET of less than 0.20 m$^2$/g is not obtained. In a more particular embodiment, 1−a−b≥0.5 and 1+x<1.000. Also, the material may comprise up to 2 mol % of W, Mo, Nb, Zr, or a rare earth element. In one embodiment, the material comprises a second phase LiN$_{x'}$O$_{y'}$ with 0<x'<1 and 0<y'<2, where N is either one or more of W, Mo, Nb, Zr and rare earth elements. Authors speculate that materials modified with proper additives or dopants can feature enhanced hardness strength and also an improved cycle life. This is for example the case of additives or dopants T such as W, Mo, Nb, Zr, or rare earth elements. Such T elements have the property to alloy with Li (for example $Li_2ZrO_3$, $(Li_2O)_n(WO_3)$ with n=1, 2, 3; or $Li_3NbO_4$) and sometimes also with M=Co, Ni and Mn as in $Li_4MWO_6$ compounds. Such T-containing alloys are stable and accumulate at the grain boundary of particles; it results in a stabilization of the grain boundary offering better mechanical resistance to stress and during repeated electrochemical cycling.

The material may have a $Al_2O_3$ surface coating, resulting in an alumina content greater than 1000 ppm, or even greater than 2000 ppm. The cathode materials according to the invention may have less than 3000 pm F. In one embodiment, the material may have a S wt % content lower than 0.5 wt %, or lower than 0.25 wt %, or even lower than 0.15 wt %.

In various embodiments the following features are provided:

$\Delta \Gamma(P) \leq 150\% + (1-2a-b) \times 160\%$ for P=300 MPa, or
$\Delta \Gamma(P) \leq 125\% + (1-2a-b) \times 100\%$ for P=300 MPa, or
$\Delta \Gamma(P) \leq 180\%$ for P=300 MPa, or
$\Delta \Gamma(P) \leq 140\%$ for P=300 MPa, or
$\Delta \Gamma(P) \leq 100\%$ for P=300 MPa.

For the powderous positive electrode material according to the invention they may have a BET value after wash >1 $m^2/g$, or also greater than 1.5 $m^2/g$, they may have a pressed density greater than 3.0 $g/cm^3$, or greater than 3.2 $g/cm^3$, or also greater than 3.4 $g/cm^3$.

they may have a soluble base content ($Li_2CO_3$+LiOH)<0.8 wt %, or $Li_2CO_3$ wt %+LiOH wt %<0.5 wt %, or also $Li_2CO_3$ wt %+LiOH wt %<0.3 wt %.

they may comprise secondary particles substantially free from porosities larger than 20 nm, or even free from porosities larger than 10 nm, as is illustrated in FIG. 9-10.

they may comprise secondary particles comprising less than 20 voids larger than 20 nm or even less than 10 voids larger than 20 nm, as is illustrated in FIG. 9-10.

they may have a FWHM value of the (104) peak as defined by the pseudo hexagonal lattice with R-3 m space group which is greater than 0.125 2-theta degrees, or greater than 0.140 2-theta degrees, or even greater than 0.150 2-theta degrees.

they may have a FWHM value of the (015) peak as defined by the pseudo hexagonal lattice with R-3 m space group which is greater than 0.125 2-theta degrees, or greater than 0.140 2-theta degrees, or even greater than 0.150 2-theta degrees.

they may have a FWHM value of the (113) peak as defined by the pseudo hexagonal lattice with R-3 m space group which is greater than 0.16 2-theta degrees, or greater than 0.18 2-theta degrees, or even greater than 0.20 2-theta degrees.

The cathode materials according to the invention may have a 0.1 C Efad.≤$(1-2a-b) \times 10\%$, or a 0.1 C Efad.≤$(1-2a-b) \times 5\%$, or a 1 C Efad.≤$(1-2a-b) \times 20\%$ (see in the detailed description, part a) and c) for the electrochemical testing experiments). The material may cycle for at least 1000 cycles, or at least 1500 cycles with a retained capacity above 80% at room temperature in a full cell. The material may also cycle for at least 900 cycles, or even at least 1500 cycles with a retained capacity above 80% at 45° C. in a full cell.

It is clear that further product embodiments according to the invention may be provided by combining features that are covered by the different product embodiments described before.

Viewed from a second aspect, the invention may provide a powderous positive electrode material incorporated in an electrode and having an electrode density greater than $3.0+((1-2a-b)/2)$ $g/cm^3$.

Viewed from a third aspect, the invention may provide a lithium secondary battery comprising a positive electrode active material comprising particles of lithium-transition metal oxide; a Li-free negative electrode, a separator interposed between the positive electrode and the negative electrode; and a non-aqueous electrolyte, wherein the particles of the positive electrode active material have a $\Delta \Gamma(P)$ values which is no more than $(1-2a-b) \times 180\%$ for P=300 MPa, or no more than $2(1-x)(1-a-b) \times 140\%$ for 300 MPa, or even less than $(1-a-b) \times 100\%$ at 300 MPa. In an embodiment the material has a FWHM of the (104) peak greater than 0.16 2-theta and demonstrates at least 1000 cycles, or even 1500 cycles with a retained capacity above 80% at room temperature. In an embodiment the material has a FWHM of the (104) peak greater than 0.16 2-theta and demonstrates at least 900 cycles with a retained capacity above 80% at 45° C.

Viewed from a fourth aspect, the invention may provide a method for preparing a powderous positive electrode material according to the invention, the material having the general formula $Li_{1+x}[Ni_{1-a-b-c}M_aM'_bM''_c]_{1-x}O_{2-z}$, and the method comprising the steps of:

providing a mixture of one or more precursor materials comprising either one or more of Ni, M, M' and M'', and a precursor material comprising Li, sintering the mixture at a temperature T expressed in ° C., with $(945-(248*(1-2a-b)) \leq T \leq (985-(248*(1-2a-b)))$, thereby obtaining agglomerated particles, and pulverizing the agglomerated particles whereby a powder is obtained having a BET≤0.37 $m^2/g$ and a $D_{max}$<50 μm. The $D_{max}$ or D100 value is the maximum particle size of the obtained powder. In an embodiment $D_{max}$<45 μm. From the experiments below it is clear that a value for BET of less than 0.20 $m^2/g$ is not obtained.

It should be mentioned here that US2011/193013 describes a powderous lithium transition metal oxide having a layered crystal structure $Li_{1+a}M_{1-a}O_{2\pm b}M'_kS_m$ with −0.03<a<0.06, b≅0, 0≤m≤0.6, m being expressed in mol %, M being a transition metal compound, consisting of at least 95% of either one or more elements of the group Ni, Mn, Co and Ti; M' being present on the surface of the powderous oxide, and consisting of either one or more elements of the group Ca, Sr, Y, La, Ce and Zr. The products having a BET value ≤0.37 $m^2/g$ have been fired at a too high temperature, causing an increase in porosity that leads to a decrease in hardness.

Also, US2006/233696 describes a powderous lithium transition metal oxide with the composition $Li_xM_yO_2$ and prepared by solid state reaction in air from a mixed transition metal precursor and $Li_2CO_3$, the powder being practically free of $Li_2CO_3$ impurity. In the formula M=$M'_{1-k}A_k$, where M'=$Ni_{1-a-b}(Ni_{1/2}Mn_{1/2})_a$ $Co_b$ on condition of 0.65≤a+b≤0.85 and 0.1≤b≤0.4; A is a dopant; and 0≤k≤0.05; and x+y=2 on condition of 0.95≤x≤1.05. The BET surface area of the prepared products is too high, causing a decrease in hardness.

Finally, in US2010/112447 the positive electrode active material includes a composite oxide containing lithium and Ni, Mn, and Co. The molar ratio of Ni is from 0.45 to 0.65, and the molar ratio of Mn is from 0.15 to 0.35. The positive electrode active material has a pressed density under a compression of 60 MPa of 3.3 g/cm$^3$ or more and 4.3 g/cm$^3$ or less. The positive electrode active material has a volume resistivity under a compression of 60 MPa of 100 Ω·cm or more and less than 1000 Ω·cm. The disclosed material however have a (Ni+Mn+Co):Li ratio of 1:1.03 or more, or 1:0.95. This ratio is either too high or too low to allow to obtain products with the desired hardness.

DETAILED DESCRIPTION

Figure 1:
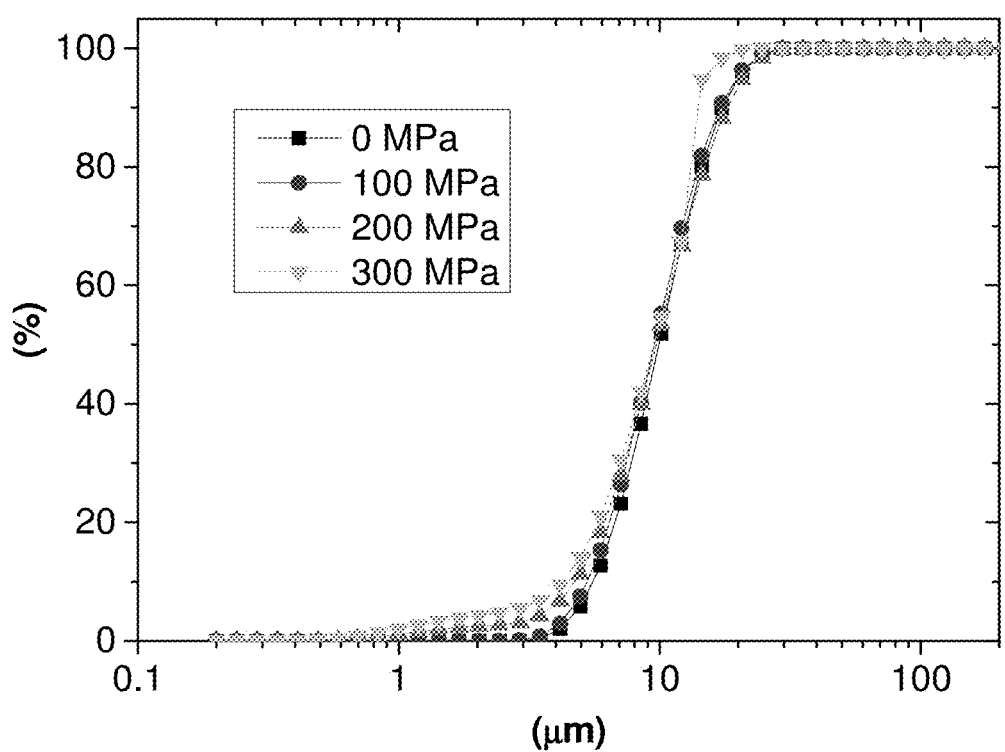
FIG. 1: evolution of the cumulative particle size distribution $\Gamma^P$ as function of uni-axial stress P, for P=0, 100, 200 and 300 MPa for Example 1.

This invention provides a cathode material able to sustain a large mechanical stress during electrode making and electrochemical stress in power-demanding applications. Such cathode material has an improved cycle life at both room temperature and 45° C. in full cells. Hence, the materials according to the invention offer significant advantages such as:
- a state of the art electrode density that facilitates the electrode production process: the cathode materials secondary particles are able to sustain high uni-axial stress during electrode manufacturing, with a substantially lower fracture and breaking risk,
- an increase in cycle life: the cathode materials' secondary particles show substantially lower fracturing and breaking after electrode manufacturing and upon electrochemical cycling at high C-rate, and a good contact between the cathode secondary particles, the binder, the conductive agent and the current collector is preserved within the electrode, and,
- an improved cycle life at elevated temperature. The BET increase of cathode active materials able to sustain higher stress according to the invention is minimized after electrode pressing and due to particle breaking upon cycling, and hence this is limiting the surface exposure where side reactions such as electrolyte oxidation at higher voltage are occurring.

The methods for preparing the materials according to the invention are generally known, but it is by a proper selection of parameters such as sintering temperature and Li/metal ratio in a single step cooking process—depending largely on the content of Ni$^{3+}$ in the compounds—that the superior hardness and other characteristics may be achieved. In practice the sintering temperature of the cooking step is limited to (985−(248*(1−2a−b))° C., and the Li:M ratio (=(1+x)/(1−x)) is between 0.98 and 1.02. A minimum sintering temperature can also be established as (945−(248*(1−2a−b))° C., to ensure that the reaction between the precursors is completed. The reason for limiting the sintering temperature is to be found in the direct influence of that temperature on the internal porosity of the particles. When the Li:M ratio is below 0.98, there is a serious decrease in capacity, since the amount of Ni that is located in Li sites increases considerably. When the Li:M ratio is more than 1.02, the soluble base content increases, leading to problems like serious gas generation in full cells, as is discussed in WO2012/107313.

Also important for the process is that after sintering the agglomerated particles are softly crushed or milled to ensure a proper hardness, and, since the milling increases the BET value, softly milling means that the BET of the milled product may be limited to ≤0.37 m$^2$/g. As crushing and milling may lead to a very high value for $D_{max}$ (being the maximum particle size), whereby the capacity is seriously hampered, the milling may be controlled to lead to a $D_{max}$<50 μm.

General Description of Experiments a) Evaluation of Electrochemical Properties in Coin Cells Electrodes are prepared as follows: about 27.27 wt. % of active cathode material, 1.52 wt. % polyvinylidene fluoride polymer (KF polymer L #9305, Kureha America Inc.), 1.52 wt. % conductive carbon black (Super P, Erachem Comilog Inc.) and 69.70 wt. % N-methyl-2-pyrrolidone (NMP) (from Sigma-Aldrich) are intimately mixed by means of high speed homogenizers. The slurry is then spread in a thin layer (typically 100 micrometer thick) on an aluminum foil by a tape-casting method. After evaporating the NMP solvent, the cast film is processed through a roll-press using a 40 micrometer gap. Electrodes are punched from the film using a circular die cutter measuring 14 mm in diameter. The electrodes are then dried overnight at 90° C. The electrodes are subsequently weighed to determine the active material loading. Typically, the electrodes contain 90 wt. % active materials with an active materials loading weight of about 17 mg (~11 mg/cm$^2$). The electrodes are then put in an argon-filled glove box and assembled within a 2325-type coin cell body. The anode is a lithium foil having a thickness of 500 micrometers (origin: Hosen); the separator is a Tonen 20 MMS microporous polyethylene film. The coin cell is filled with a 1 M solution of LiPF$_6$ dissolved in a mixture of ethylene carbonate and dimethyl carbonate in a 1:2 volume ratio (origin: Techno Semichem Co.).

Each cell is cycled at 25° C. using Toscat-3100 computer-controlled galvanostatic cycling stations (from Toyo). The coin cell testing schedule 1 used to evaluate EX1, EX2, EX3, EX4, CEX1 and CEX2 is detailed in Table 8. Coin cell schedule 2 used to evaluate EX5, EX6, EX7, EX8, EX9 and EX10 is detailed in Table 9. Both schedules use a 1 C current definition of 160 mA/g and comprise 3 parts as follows:

(i) Part I is the evaluation of rate performance at 0.1 C, 0.2 C, 0.5 C, 1 C, 2 C and 3 C in the 4.3~3.0V/Li metal window range. With the exception of the 1$^{st}$ cycle where the initial charge capacity CQ1 and discharge capacity DQ1 are measured in constant current mode (CC), all subsequent cycles feature a constant current-constant voltage during the charge with an end current criterion of 0.05 C. A rest time of 30 minutes for the first cycle and 10 minutes for all subsequent cycles is allowed between each charge and discharge.

The irreversible capacity Q$_{irr.}$ is expressed in % as:

$$Q_{Irr.} = \frac{(CQ1 - DQ1)}{CQ1} \times 100 \, (\%)$$

The rate performance at 0.2 C, 0.5 C, 1 C, 2 C and 3 C is expressed as the ratio between the retained discharge capacity DQn, with n=2, 3, 4, 5 and 6 for respectively nC=0.2 C, 0.5 C, 1 C, 2 C and 3 C as follows:

$$nC-\text{rate} = \frac{DQn}{DQ1} \times 100 \, (\%),$$

e.g. 3 C-rate (in %)=(DQ$_6$/DQ$_1$)×100.

(ii) Part II is the evaluation of cycle life at 1 C. Coin cell schedules 1 and 2 only differ in the charge cutoff voltage, being 4.5V and 4.3V/Li metal for schedules 1 and 2 respectively. The discharge capacity at 4.5V/Li metal is measured at 0.1 C at cycle 7 and 1 C at cycle 8. Capacity fadings at 0.1 C and 1 C are calculated as follows and are expressed in % per 100 cycles:

$$0.1C \; QFad. = \left(1 - \frac{DQ34}{CQ7}\right) \times \frac{10000}{27} \text{ in \%/100 cycles,}$$

$$1C \; QFad. = \left(1 - \frac{DQ35}{CQ7}\right) \times \frac{10000}{27} \text{ in \%/100 cycles.}$$

Energy fadings at 0.1 C and 1 C are calculated as follows and are expressed in % per 100 cycles. $\overline{Vn}$ is the average voltage at cycle n.

$$0.1C \; EFad. = \left(1 - \frac{DQ34 \times \overline{V34}}{CQ7 \times \overline{V7}}\right) \times \frac{10000}{27} \text{ in \%/100 cycles,}$$

$$1C \; EFad. = \left(1 - \frac{DQ35 \times \overline{V35}}{CQ7 \times \overline{V7}}\right) \times \frac{10000}{27} \text{ in \%/100 cycles.}$$

(iii) Part III is an accelerated cycle life experiment using 1 C-rate for the charge and 1 C rate for the discharge between 4.5 and 3.0V/Li metal. Capacity and energy fading are calculated as follows:

$$1C/1C \; QFad. = \left(1 - \frac{DQ60}{CQ36}\right) \times \frac{10000}{27} \text{ in \%/100 cycles,}$$

$$1C/1C \; EFad. = \left(1 - \frac{DQ60 \times \overline{V60}}{GQ36 \times \overline{V36}}\right) \times \frac{10000}{27} \text{ in \%/100 cycles,}$$

b) Full Cell Manufacturing 650 mAh pouch-type cells are prepared as follows: the positive electrode active material powder is prepared as described above, Super-P (Super-P™ Li commercially available from Timcal), and graphite (KS-6 commercially available from Timcal) as positive electrode conductive agents and polyvinylidene fluoride (PVdF 1710 commercially available from Kureha) as a positive electrode binder are added to NMP (N-methyl-2-pyrrolidone) as a dispersion medium so that the mass ratio of the positive electrode active material powder, the positive electrode conductive agent, and the positive electrode binder is set at 92/3/1/4. Thereafter, the mixture is kneaded to prepare a positive electrode mixture slurry. The resulting positive electrode mixture slurry is then applied onto both sides of a positive electrode current collector, made of a 15 μm thick aluminum foil. The width of the applied area is 43 mm and the length is 450 mm. Typical cathode active material loading weight is 13.9 mg/cm$^2$. The electrode is then dried and calendared using a pressure of 100 Kgf. Typical electrode density is 3.2 g/cm$^3$. In addition, an aluminum plate serving as a positive electrode current collector tab is arc-welded to an end portion of the positive electrode.

Commercially available negative electrodes are used. In short, a mixture of graphite, CMC (carboxy-methyl-cellulose-sodium) and SBR (styrene-butadiene-rubber), in a mass ratio of 96/2/2, is applied on both sides of a copper foil. A nickel plate serving as a negative electrode current collector tab is arc-welded to an end portion of the negative electrode. Typical cathode and anode discharge capacity ratio used for cell balancing is 0.75. Non-aqueous electrolyte is obtained by dissolving lithium hexafluorophosphate (LiPF$_6$) salt at a concentration of 1.0 mol/L in a mixed solvent of EC (ethylene carbonate) and DEC (diethyl carbonate) in a volume ratio of 1:2.

A sheet of the positive electrode, a sheet of the negative electrode, and a sheet of separator made of a 20 μm-thick microporous polymer film (Celgard® 2320 commercially available from Celgard) interposed between them are spirally wound using a winding core rod in order to obtain a spirally-wound electrode assembly. The wounded electrode assembly and the electrolyte are then put in an aluminum laminated pouch in an air-dry room with dew point of −50° C., so that a flat pouch-type lithium secondary battery is prepared. The design capacity of the secondary battery is 650 mAh when charged to 4.20 V. The non-aqueous electrolyte solution is impregnated for 8 hrs at room temperature. The battery is pre-charged at 15% of its theoretical capacity and aged 1 day, also at room temperature. The battery is then degassed using a pressure of −760 mm Hg for 30 sec, and the aluminum pouch is sealed. The battery is prepared for use as follows: the battery is charged using a current of 0.2 C (with 1 C=650 mA) in CC mode (constant current) up to 4.2V then CV mode (constant voltage) until a cut-off current of C/20 is reached, before being discharged in CC mode at 0.5 C rate down to a cut-off voltage of 2.7V.

c) Cycle Life Experiments

The lithium secondary full cell batteries are charged and discharged several times under the following conditions, both at 25° C. and 45° C., to determine their charge-discharge cycle performance:

Charge is performed in CC mode under 1 C rate up to 4.2V, then CV mode until C/20 is reached,
The cell is then set to rest for 10 min,
Discharge is done in CC mode at 1 C rate down to 2.7V,
The cell is then set to rest for 10 min,
The charge-discharge cycles proceed until the battery reaches 80% retained capacity. Every 100 cycles, the discharge is done at 0.2 C rate in CC mode down to 2.7 V.

The retained capacity at the $n^{th}$ cycle is calculated as the ratio of the discharge capacity obtained at cycle n to cycle 1.

d) XRD

XRD patterns are recorded on a Rigaku D/MAX 2200 PC X-ray diffractometer in the 17-144 2-theta range in a 0.02 degree scan step. Scan speed is set to 1.0 degree per minute. The goniometer with theta/2 theta Bragg Brentano geometry has a radius of 185 mm. The copper target X-ray tube is operated at 40 KV and 40 mA. The diffracted beam monochromator, based on a curved graphite crystal, is used to remove KBeta Cu radiation. The collected XRD patterns comprise KAlpha Cu radiations with typical wavelengths $KAlpha_1$=1.5405 Å and $KAlpha_2$=1.5443 Å in an $IAlpha_2/IAlpha_1$ intensity ratio of ½ using a conventional scintillation counter detector. The incident beam optic setup comprises a 10 mm divergent height limiting slit (DHLS), a 1-degree divergence slit (DS) and 5 degree vertical Soller slit. The diffracted beam optic setup includes a 1-degree anti-scatter slit (SS), 5 degree vertical Soller slit and 0.3 mm reception slit (RS). Crystallinity of the different materials is calculated from the full width at half maximum (FWHM) of the (003) and (104) peaks where the hkl miller indices correspond to the O3-type hexagonal lattice with R-3 m space group as defined by J. J. Braconnier, C. Delmas, C. Fouassier, and P. Hagenmuller, Mat. Res. Bull. 15, 1797 (1980). FWHM is determined by further subtraction of the background contribution using the Sonnevelt-Visser's algorithm and $KAlpha_2$ elimination as implemented in the "Integral analysis v6.0" software from Rigaku between 17 and 20 2-theta and 43 and 43.5 2-theta for (003) and (104) peaks, respectively.

The FWHMs of the 015, 018, 110 and 113 reflections have been calculated by local fitting of the experimental intensities Iobs. after $KAlpha_2$ elimination using pseudo-Voigt functions as follows:

$$I_{calc.}(2\theta) = I_0 + \sum_{i=1}^{n} I_i \left( \mu_i \left(\frac{2}{\pi}\right)\left(\frac{FWHM_i}{4(2\theta - 2\theta_{0,i})^2 + FWHM_i^2}\right) + (1 - \mu_i)\frac{\sqrt{4\ln(2)}}{\sqrt{\pi}\, FWHM_i} e^{\left(-\frac{4\ln(2)}{FWHM_i^2}(2\theta - 2\theta_{0,i})^2\right)} \right)$$

Where:
$I_0$ is the background level (in counts),
n is the number of diffracted peaks considered on the interval,
$I_i$, $\mu_i$, $2\theta_{0,i}$ and $FWHM_i$ are respectively the height of the pseudo-Voigt distribution (in counts), Lorentzian-Gaussian mixing ratio, $2\theta_0$ position (in 2-theta degrees) and FWHM (in 2-theta degrees) of peak i with i=1 . . . n.

Figure 15:
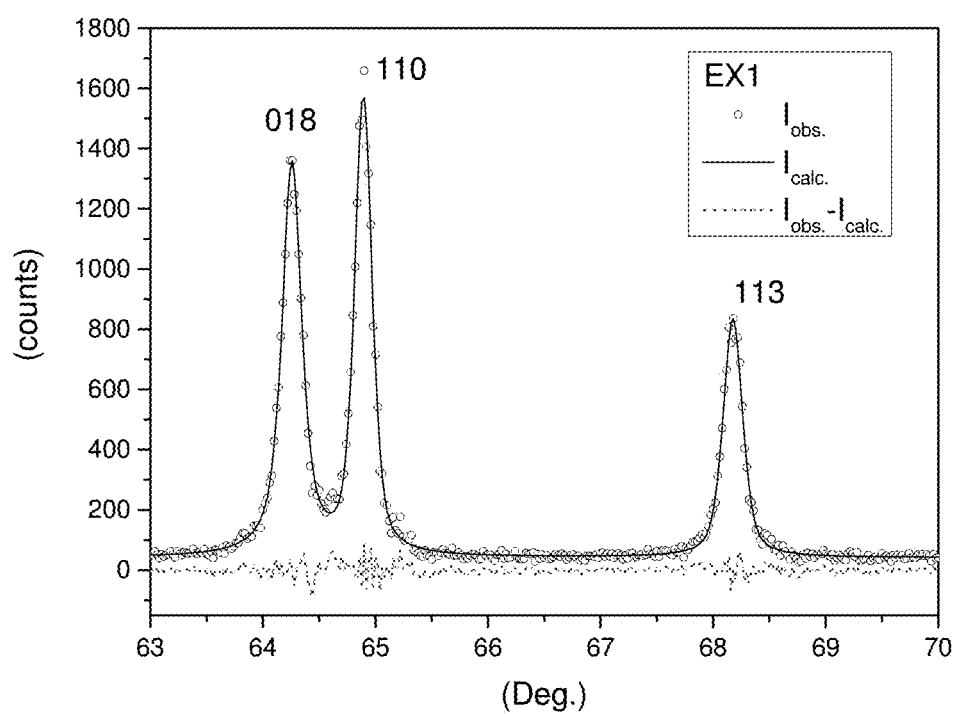
FIG. 15: example of pseudo-Voigt decomposition of 018, 110 and 113 peaks in the 63~70 2-theta range for Example 1. The open dots are the experimental data $I_{obs.}$ after KAlpha2 subtraction, the black solid line is the fitted profile $I_{calc.}$ using 3 pseudo-Voigt functions and the dashed line represents the $(I_{obs.}-I_{calc.})$ quantity.

An example of such pseudo-Voigt fitting with n=3 peaks on the 63~70 2-theta range is shown on FIG. 15. 018, 110 and 113 peaks are well fitted with square correlation coefficient $R^2$ in excess of 99.5%. The authors emphasize that FWHM determination in such conditions is a trivial operation and can be done with a large variety of academic/open/commercial software.

e) Material Hardness Evaluation

Materials hardness is estimated by means of particle size evolution under uni-axial stress as follows:

Cathode active material is put in a stainless-steel pellet die and a uni-axial pressure of 100, 200 and 300 MPa is applied. The obtained pellet is then gently unraveled with the finger to obtain a loose powder for laser particle size distribution measurement. The use of strong de-agglomeration methods such as agate mortar is not suitable for this step as the particles would be further broken and the fraction of fine particles would be increased.

The laser particle size distribution is measured using a Malvern Mastersizer 2000 with Hydro 2000MU wet dispersion accessory after dispersing the powder in an aqueous medium. In order to improve the dispersion of the powder in the aqueous medium, sufficient ultrasonic irradiation, typically 1 minute for an ultrasonic displacement of 12, and stirring are applied and an appropriate surfactant is introduced.

a Hardness Strength Index (HSI) is defined as follows:

$$\Delta \Gamma(P) = \frac{\Gamma^P(D10_{P=0}) - \Gamma^0(D10_{P=0})}{\Gamma^0(D10_{P=0})} \times 100 \text{ (in \%)}$$

where:
$D10_{P=0}$ is the D10 value of the unconstrained powder (P=0 MPa),
$\Gamma^0(D10_{P=0})$ is the cumulative volume particle size distribution of the unconstrained powder at $D10_{P=0}$. Note that by definition $\Gamma^0(D10_{P=0})$ always equals 10%.
$\Gamma^P(D10_{P=0})$ is the cumulative volume particle size distribution of the pressed samples with P=100, 200 and 300 MPa at $D10_{P=0}$. This value can be determined by direct reading on the plot or by local approximation using fitting functions.

An increase in the $\Gamma^P(D10_{P=0})$ value after the uni-axial compression stress is direct evidence that particles have been broken into smaller particles. $\Delta \Gamma(P)$ is the relative increase of $\Gamma^P(D10_{P=0})$ compared to $\Gamma^0(D10_{P=0})$ and is expressed in %. The change in the $\Gamma^P(D10_{P=0})$ and $\Delta \Gamma(P)$ are therefore quantitative measures for determining the HSI of cathode powders according to the invention. Such evolution of the cumulative particle size as function of uniaxial stress is shown on FIG. 1, and more explicitly on FIG. 2 for Example 1 (see also below). In one embodiment, the powderous lithium mixed metal oxides according to the invention have a $\Delta \Gamma(P)$ value which increases by no more than 100%+(1−2a−b)×160% under 200 MPa, in another embodiment 150%+(1−2a−b)×160% under 300 MPa and in still another embodiment 125%+(1−2a−b)×100% under 300 MPa; where a and b are the molar contents of Mn and Co resp. in the cathode compound $Li_{1+x}[Ni_{1-a-b-c}M_a M'_b M''_c]_{1-x}O_{2-z}$.

f) Pressed Density

The pressed density is measured as follows: 3 grams of powder is filled into a pellet die with a diameter "d" of 1.300 cm. A uniaxial load of 2.8 tons, corresponding to a pressure of 207 MPa, is applied for 30 seconds. After relaxing the load, the thickness "t" of the pressed powder is measured. The pellet density is then calculated as follows:

$3/(\pi \times (d/2)^2 \times t)$ in $g/cm^3$.

Also, the density of the powder under 300 MPa load is measured and gives information about the pressed density increase due to secondary particles breaking into smaller particles. In particular, smaller particles increase the apparent density by filling the voids of the secondary particles packing. The more the secondary particles break and create fines, the higher the density. This property is listed as density at 300 MPa in the tables and is calculated as follows: $3/(\pi \times (d/2)^2 \times t)$ in $g/cm^3$; where "d" is the diameter of the die (equal to 1.3 cm) and "t" is the thickness of the pellet under 300 MPa load.

g) BET Specific Surface Area

The specific surface area is measured with the Brunauer-Emmett-Teller (BET) method using a Micromeritics Tristar 3000. 3 g of powder sample is vacuum dried at 300° C. for 1 h prior to the measurement in order to remove adsorbed species. The "true" BET is measured as follows: 10 g of powder sample is immerged in 100 g water and stirred for 10 mins at room temperature. The aqueous solution is then removed using Buchner filtration with suction. The washed powder is collected and dried at 120° C. for 3 h. The true BET is then measured on the washed powder using the same experimental conditions as ditto. The true BET is believed to be representative of the BET seen in the full cell once all Li-salts, such as LiOH, $Li_2CO_3$, $Li_2SO_4$, . . . have dissolved in the electrolyte at potentials higher than 4V. In this case, precious qualitative information is given on the microporosity of the particles; it is for example expected that the smaller the pores, the higher the true BET.

h) Residual $Li_2CO_3$ and LiOH Titration

The base content is a material surface property that can be quantitatively measured by the analysis of reaction products between the surface and water. If powder is immersed into water a surface reaction occurs. During the reaction the pH of the water increases (as basic compounds dissolve) and the base is quantified by a pH titration. The result of the titration is the "soluble base content" (SBC). The content of soluble base can be measured as follows: 100 ml of de-ionized water is added to 20 g of cathode powder when $Ni^{3+}$ content <0.4 and 4 g of cathode powder when $Ni^{3+}$ content ≥0.4, followed by stirring for 10 minutes. The aqueous solution is then removed by using Buchner filtration with suction, thereby achieving >90 g of clear solution which contains the soluble base. The content of soluble base is titrated by logging the pH profile during addition of 0.1 M HCl at a rate of 0.5 ml/min until the pH reaches 3 under stirring. A reference voltage profile is obtained by titrating suitable mixtures of LiOH and $Li_2CO_3$ dissolved in low concentration in DI water. In almost all cases two distinct plateaus are observed. The upper plateau with endpoint γ1 (in mL) between pH 8~9 is $OH^-/H_2O$ followed by $CO_3^{2-}/HCO_3^-$, the lower plateau with endpoint γ2 (in mL) between pH 4~6 is $HCO_3^-/H_2CO_3$. The inflection point between the first and second plateau γ1 as well as the inflection point after the second plateau γ2 are obtained from the corresponding minima of the derivative dpH/dVol of the pH profile. The second inflection point generally is near to pH 4.7. Results are then expressed in LiOH and $Li_2CO_3$ weight percent as follows:

$$Li_2CO_3 \text{ wt \%} = \frac{73.8909}{1000} \times (\gamma_2 - \gamma_1);$$

$$LiOH \text{ wt \%} = \frac{23.9483}{1000} \times (2 \times \gamma_1 - \gamma_2).$$

i) ICP for Sulfur Titration

Sulfur content is measured using inductively coupled plasma atomic emission spectroscopy (ICP-OES) using an Agilent 720 series equipment. The analytic results are expressed in weight percent.

The invention is further illustrated in the following examples:

Example 1

The powderous cathode material of Example 1 (EX 1) is prepared by using a conventional high temperature sintering. $Li_2CO_3$ (Chemetall) and a Umicore mass-produced metal oxy-hydroxide precursor with Ni/Mn/Co molar ratio of 5/3/2 are mixed in a Li:M molar ratio of 1.01, resulting in the general composition of $Li_{1.005}Ni_{0.498}Mn_{0.299}Co_{0.199}O_2$ or $Li_{1.005}[Ni_{0.5}Mn_{0.3}Co_{0.2}]_{0.995}O_2$. The mixture is reacted at a temperature of 910° C. for 10 hours using pilot-scale equipment. The sintered cake is then crushed and classified so as to obtain a non-agglomerated powder with a mean particle size D50 of 9.9 µm.

Electrochemical and physical properties are shown on Tables 1 to 7.

Example 2

The powderous cathode material of Example 2 (EX 2) is prepared by using a conventional high temperature sintering. $Li_2CO_3$ (Chemetall) and a Umicore mass-produced metal oxy-hydroxide precursor with Ni/Mn/Co molar ratio of 5/3/2 are mixed in a Li:M molar ratio of 1.01, resulting in the general composition of $Li_{1.005}[Ni_{0.5}Mn_{0.3}Co_{0.2}]_{0.995}O_2$. The mixture is reacted at a temperature of 930° C. for 10 hours using pilot-scale equipment. The sintered cake is then crushed and classified so as to obtain a non-agglomerated powder with a mean particle size D50 of 10 µm.

Electrochemical and physical properties are shown on Tables 1 to 7.

Counter Example 1

The powderous cathode material of Counter Example 1 (CEX 1) is prepared by using a conventional high temperature sintering. $Li_2CO_3$ (Chemetall) and a Umicore mass-produced metal oxy-hydroxide precursor with Ni/Mn/Co molar ratio of 5/3/2 are mixed in a Li:M molar ratio of 1.01, resulting in the general composition of $Li_{1.005}[Ni_{0.5}Mn_{0.3}Co_{0.2}]_{0.995}O_2$. The mixture is reacted at a temperature of 950° C. for 10 hours using pilot-scale equipment. The sintered cake is then crushed and classified so as to obtain a non-agglomerated powder with a mean particle size D50 of 10 μm.

Electrochemical and physical properties are shown on Tables 1 to 7.

Example 3

The powderous cathode material of Example 3 (EX 3) is prepared by using a conventional high temperature sintering. $LiOH \cdot H_2O$ (SQM) and a Umicore mass-produced metal oxy-hydroxide precursor with Ni/Mn/Co molar ratio of 6/2/2 are mixed in a Li:M molar ratio of 1.01, resulting in the general composition of $Li_{1.005}Ni_{0.597}Mn_{0.199}Co_{0.199}O_2$ or $Li_{1.005}[Ni_{0.6}Mn_{0.2}Co_{0.2}]_{0.995}O_2$. The mixture is reacted at a temperature of 860° C. for 10 hours using pilot-scale equipment. The sintered cake is then crushed and classified so as to obtain a non-agglomerated powder with a mean particle size D50 of 11.6 μm.

Electrochemical and physical properties are shown on Tables 1 to 7.

Example 4

The powderous cathode material of Example 4 (EX 4) is prepared by using a conventional high temperature sintering. $Li_2CO_3$ (Chemetall) and a Umicore mass-produced metal oxy-hydroxide precursor with Ni/Mn/Co molar ratio of 6/2/2 are mixed in a Li:M molar ratio of 1.01, resulting in the general composition of $Li_{1.005}[Ni_{0.6}Mn_{0.2}Co_{0.2}]_{0.995}O_2$. The mixture is reacted at a temperature of 870° C. for 10 hours using pilot-scale equipment. The sintered cake is then crushed and classified so as to obtain a non-agglomerated powder with a mean particle size D50 of 12.8 μm.

Electrochemical and physical properties are shown on Tables 1 to 7.

Counter Example 2

The powderous cathode material of Counter Example 2 (CEX 2) is prepared by using a conventional high temperature sintering. $Li_2CO_3$ (Chemetall) and a Umicore mass-produced metal oxy-hydroxide precursor with Ni/Mn/Co molar ratio of 6/2/2 are mixed in a Li:M molar ratio of 1.01, resulting in the general composition of $Li_{1.005}[Ni_{0.6}Mn_{0.2}Co_{0.2}]_{0.995}O_2$. The mixture is reacted at a temperature of 890° C. for 10 hours using pilot-scale equipment. The sintered cake is then crushed and classified so as to obtain a non-agglomerated powder with a mean particle size D50 of 12.8 μm.

Electrochemical and physical properties are shown on Tables 1 to 7.

Examples 5, 6 and 7

These examples will demonstrate that the particle brittleness and cycle life can be affected by modifying the Li:M composition. The powderous cathode material of Example 5, 6 and 7 (EX 5, 6 and 7) is prepared by using a conventional high temperature sintering. $Al_2O_3$ powder, $LiOH \cdot H_2O$ (SQM) and a Umicore mass-produced Ni, Co oxy-hydroxide precursor with a Ni/Co molar ratio of 84.2/15.8 are mixed in order to achieve a Ni/Co/Al molar ratio of 81.7/15.3/3.0 and Li:M equal to 0.98, 1.00 and 1.02 for EX5, EX6 and EX7, respectively. Heat treatment is conducted at a temperature of 775° C. for 10 hours under $O_2$ flow (4 m³/Kg) using laboratory-scale equipment. The sintered cakes are then crushed and classified so as to obtain non-agglomerated powders with a mean particle size D50 of approximately 12 to 13 μm. Electrochemical and physical properties are shown on Tables 1 to 7. Cross-sectional SEM and particle SEM are shown on FIG. 8.

Examples 8, 9 and 10

Figure 11:
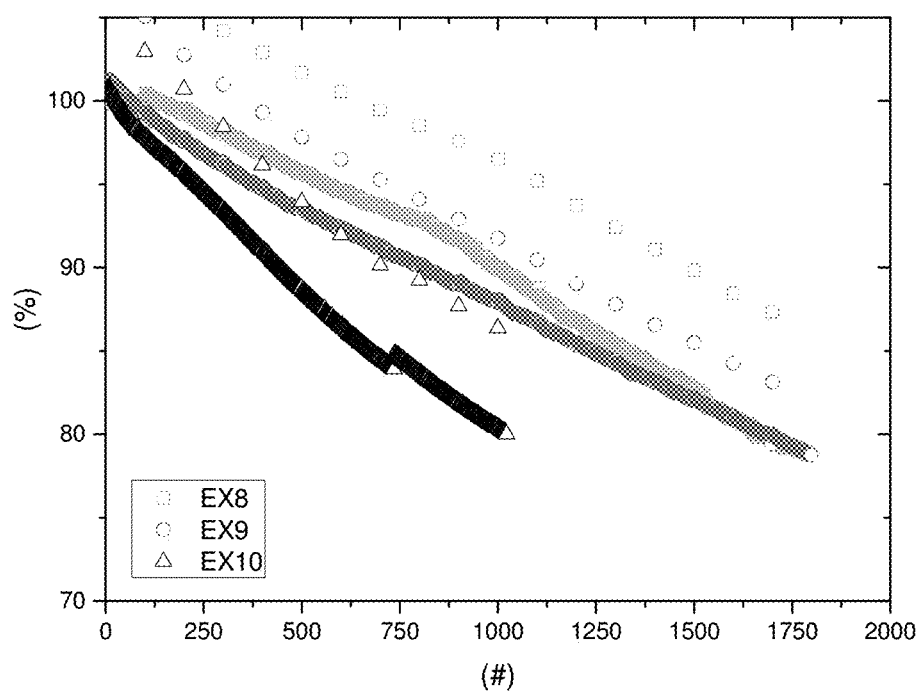
FIG. 11: full cell cycle life at room-temperature of EX8, EX9 and EX10 when cycled between 4.2 and 2.7V. Evolution of the retained capacity (in % of the initial discharge capacity) as a function of the cycle number (#).
Figure 12:
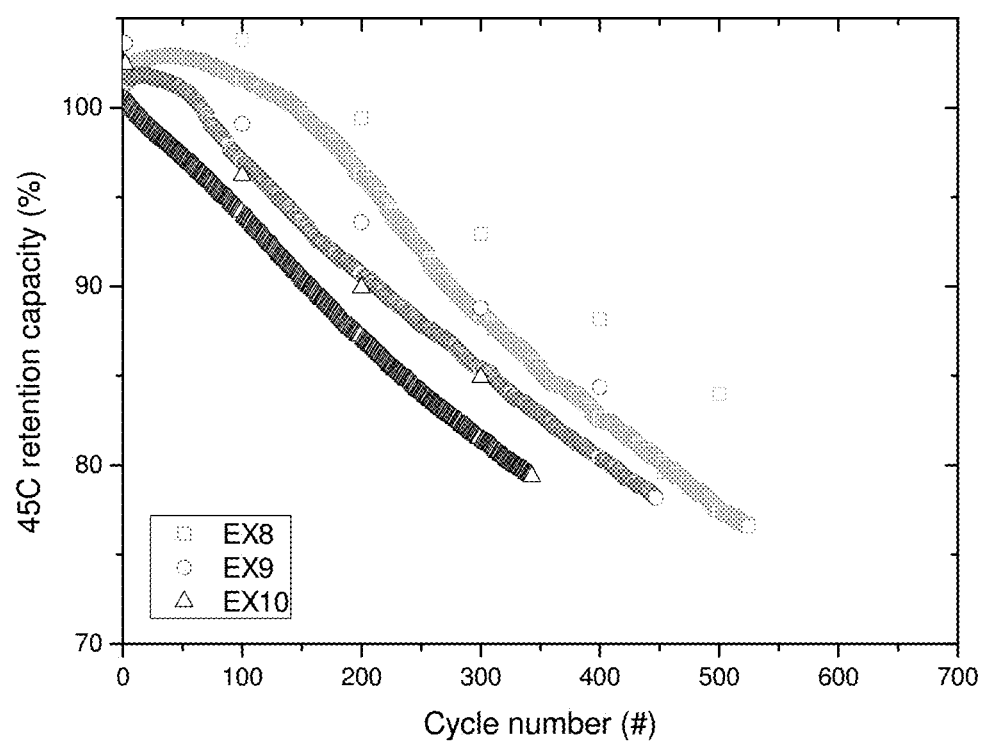
FIG. 12: full cell cycle life at 45° C. of EX8, EX9 and EX10 when cycled between 4.2 and 2.7V. Evolution of the retained capacity (in % of the initial discharge capacity) as a function of the cycle number (#).
Figure 13:
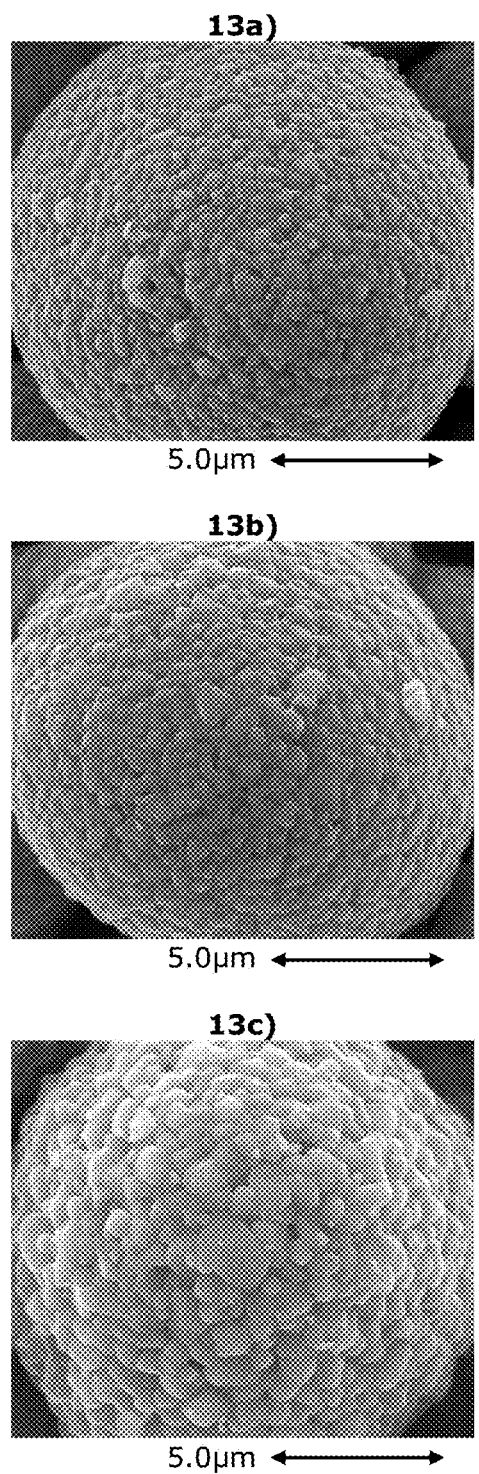
FIG. 13: SEM of secondary particles of Examples 8 (FIG. 13a), 9 (FIG. 13b) and 10 (FIG. 13c).

These examples will demonstrate that the particle brittleness and cycle life can be affected by modifying the Li:M composition and dopant concentration. The powderous cathode material of Example 8, 9 and 10 (EX 8, 9 and 10) is prepared by using a conventional high temperature sintering. $Al_2O_3$ powder, $LiOH \cdot H_2O$ (SQM) and an Umicore mass-produced Ni—Co oxy-hydroxide precursor with a Ni/Co molar ratio of 84.2/15.8 are mixed in order to achieve a Ni/Co/Al molar ratio of 81.7/15.3/3.0 and Li:M equal to 0.98 and 1.00 for respectively EX8 and EX9 and a Ni/Co/Al molar ratio of 82.8/15.5/1.7 and Li:M equal to 1.00 for EX10. Heat treatment is conducted at a temperature of 775° C. for 10 hours under $O_2$ flow (4 m³/Kg) using pilot-scale equipment. The sintered cakes are then crushed and classified so as to obtain non-agglomerated powders with a mean particle size D50 of approximately 12 to 13 μm. Electrochemical and physical properties are shown on Tables 1-7. Room temperature and 45° C. full cell performances are shown on FIGS. 11 and 12, respectively. Particle SEM's are shown on FIG. 13.

Examples 11, 12, 13, 14 and 15

200 g of cathode materials is prepared by mixing $Li_2CO_3$ (Chemetall) and a Umicore mass-produced metal oxy-hydroxide precursor with Ni/Mn/Co molar ratio of 5/3/2 in a Li:M molar ratio of 1.01 and reacting the mixture at 910° C. for 10 hours using muffle furnace. The general composition is $Li_{1.010}Ni_{0.495}Mn_{0.297}Co_{0.198}O_2$ or $Li_{1.010}[Ni_{0.5}Mn_{0.3}Co_{0.2}]_{0.990}O_2$.

The sintered cake is then crushed and 20 g of crushed product is sieved using 270 mesh size sieve (53 μm opening) resulting in Example 11 (EX11). The Dmax=D100 is 799.5 μm and the oversize fraction; determined as the weight fraction of materials not going through the sieve is 60.7%. The BET is 0.250 m²/g.

20 g of crushed product is grounded using a Cremania CG-01 150 W mill for 15 seconds resulting in Example 12 (EX12). The D max is 38.7 μm and the oversize fraction; determined as the weight fraction of materials not going through the sieve is 9.0%. The BET is 0.299 m²/g.

20 g of crushed product is grounded using a Cremania CG-01 150 W mill for 30 seconds resulting in Example 13 (EX13). The Dmax is 38.2 μm and the oversize fraction; determined as the weight fraction of materials not going through the sieve is 6.2%. The BET is 0.294 m²/g.

20 g of crushed product is grounded using a Cremania CG-01 150 W mill for 60 seconds resulting in Example 14 (EX14). The Dmax is 33.1 μm and the oversize fraction; determined as the weight fraction of materials not going through the sieve is 4.4%. The BET is 0.343 m²/g.

20 g of crushed product is grounded using a Cremania CG-01 150 W mill for 300 seconds resulting in Example 15

(EX15). The Dmax is 32.0 μm and the oversize fraction; determined as the weight fraction of materials not going through the sieve is 0.0%. The BET is 0.821 m²/g.

The physical properties of EX11 to EX15 are shown on Table 10.

The crushed product EX11 has the lowest BET and the largest oversize fraction and largest Dmax value due to agglomerated particles. EX11 has the problem of offering low production throughput because of the large oversize fraction and poor ability to make homogeneous electrodes because of large size agglomerates. EX11 is therefore unsuitable for application as lithium battery cathode materials and appropriate de-agglomeration is required.

EX12 to EX15 are prepared by increasing the milling time from 15 to 300 seconds with the result that the oversize fraction and D max continuously decrease and the BET continuously increases. A decrease in oversize fraction is a positive effect as the production throughput is increased. The BET increase is however not desirable because the rate of parasite reactions with electrolyte increases. In particular, the authors expect that the side reaction in EX15 will proceed about 2.4 times faster than in EX14 because of the BET surface increase. Therefore, only a special selection of milling conditions allow to control the Dmax, BET and oversize fraction within the embodiments of the present invention.

DISCUSSION

EX1, EX2 and CEX1

Figure 2:
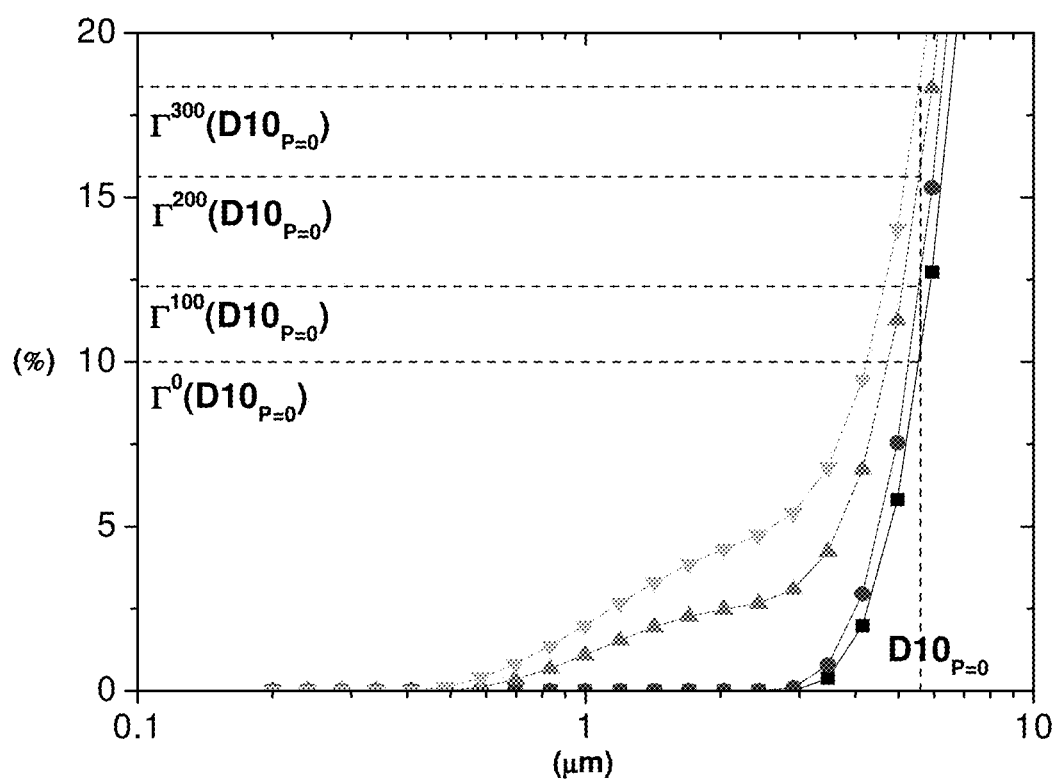
FIG. 2: enlargement of the evolution of the cumulative particle size distribution $\Gamma^P$ as function of uni-axial stress P, for P=0, 100, 200 and 300 MPa for Example 1 and showing the steps to determine $\Gamma^P(D10_{P=0})$

EX1, EX2 and CEX1 are in particular characterized by having different ΔΓ(P=300 MPa) values increasing from 83.7% for EX1, 116.4% for EX2 to 266.4% for CEX1 (data in Table 3 that are derived from FIGS. 1 and 2 in the case of EX1, for EX2 and CEX1 similar figures are obtained). This evolution of ΔΓ(P) indicates that more particles are broken into smaller particles when applying a uniaxial stress of 200 MPa and 300 MPa in CEX1 compared to EX1 and EX2.

Coin cell cycle life shows (in Table 1) that both the capacity fading and energy fading at 4.5V are increasing from EX1, EX2 to CEX1. In particular, the improvement in cycle stability is more noticeable at higher charge/discharge 1 C and 1 C/1 C rates.

Figure 3:
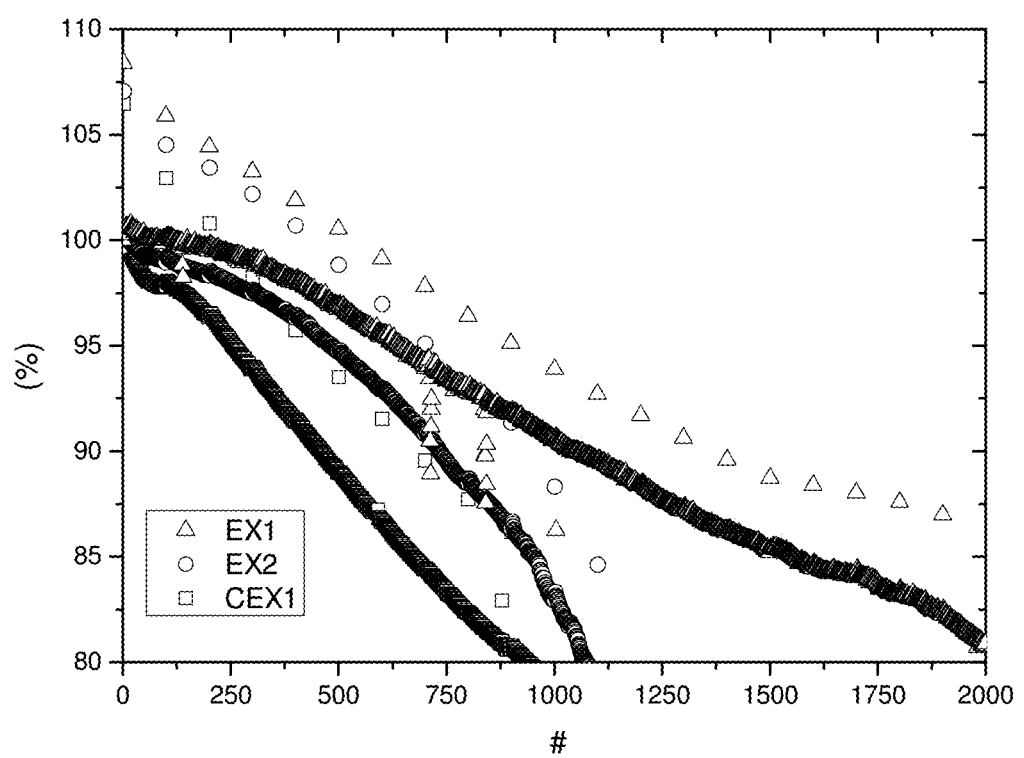
FIG. 3: full cell cycle life at room-temperature of EX1, EX2 and CEX1 when cycled between 4.2 and 2.7V. Evolution of the retained capacity (in % of the initial discharge capacity) as a function of the cycle number (#).
Figure 4:
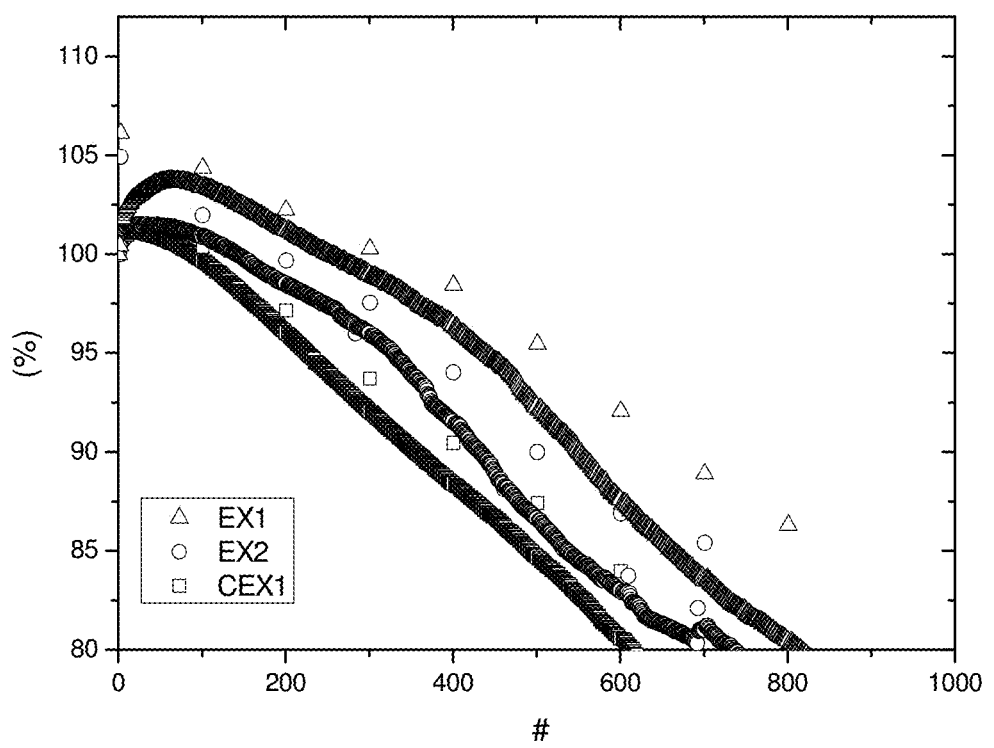
FIG. 4: full cell cycle life at 45° C. of EX1, EX2 and CEX1 when cycled between 4.2 and 2.7V. Evolution of the retained capacity (in % of the initial discharge capacity) as a function of the cycle number.

Full cell batteries using EX1, EX2 and CEX1 are fabricated as described in the general description of experiments. Electrode densities of about 3.20 g/cm³ are achieved for EX1, EX2 and CEX1, which is very close to the density value of the powders when pressed under 208 MPa. Evolutions of the retained capacity as function of cycle number are shown on FIG. 3 at room temperature, and, on FIG. 4 at 45° C. (for each the top dotted line is for Ex1, the middle is for EX2 and the bottom line is for CEX1). EX1 shows the best retention capacity with a retained capacity superior to 80% after 2000 cycles at room temperature and a retained capacity superior to 80% after 816 cycles at 45° C. (Table 5). Such a high retention capacity is particularly well-suited in the case of applications where long cycle life is required, such as electrical vehicles or grid storage. Comparatively, CEX1 demonstrates poor full cell cycling performances.

Conclusion: the decrease of ΔΓ(P) at P=200 and 300 MPa fits very well with the decrease in coin cell fading at 4.5V and improvements of full cell retention capacity upon cycling at both room temperature and 45° C.

Figure 5:
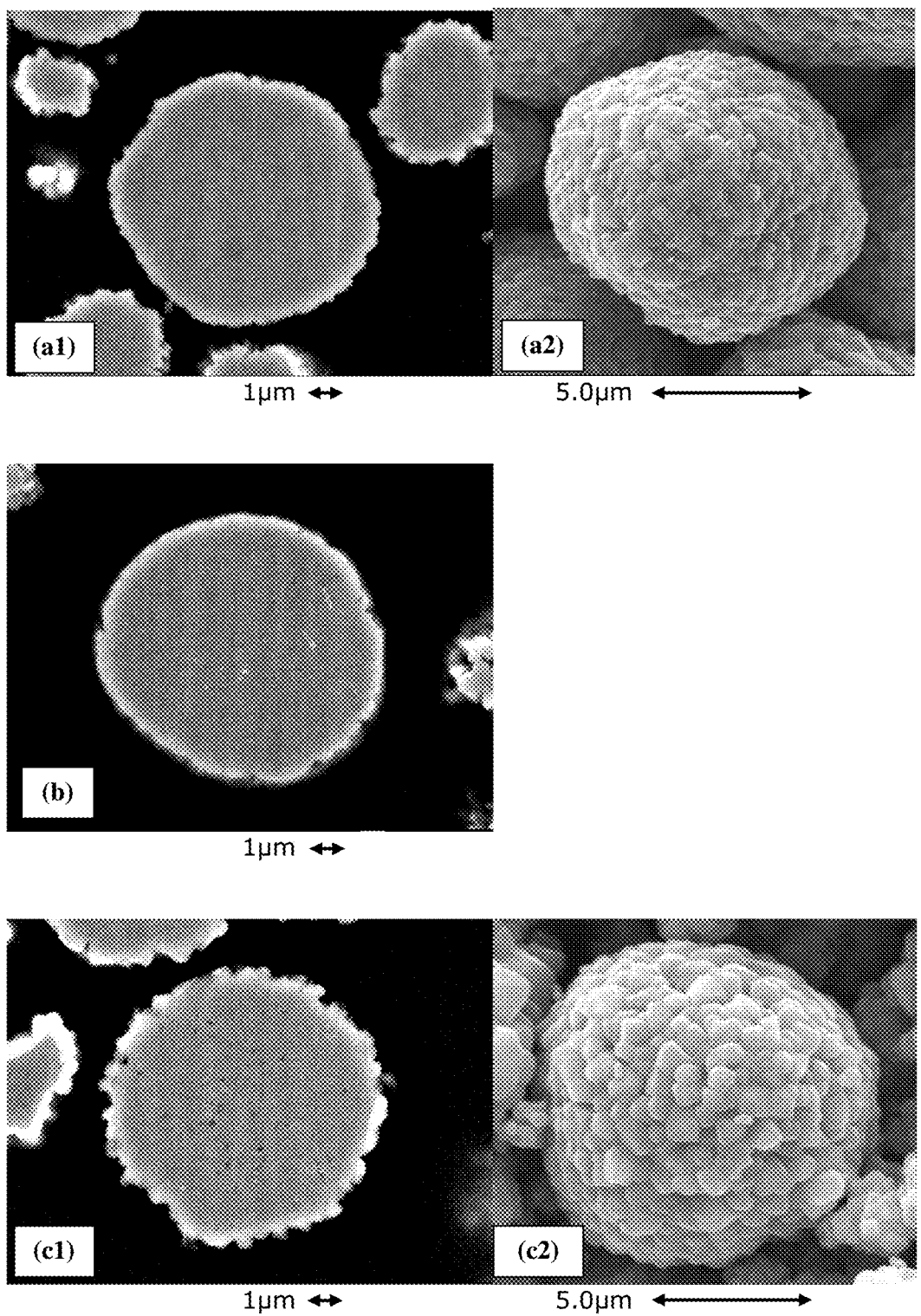
FIG. 5: cross-sectional SEM and SEM of secondary particles of Example 1 (FIGS. 5a1 and 5a2), Example 2 (FIG. 5b) and Counter Example 1 (FIGS. 5c1 and 5c2).
Figure 14:
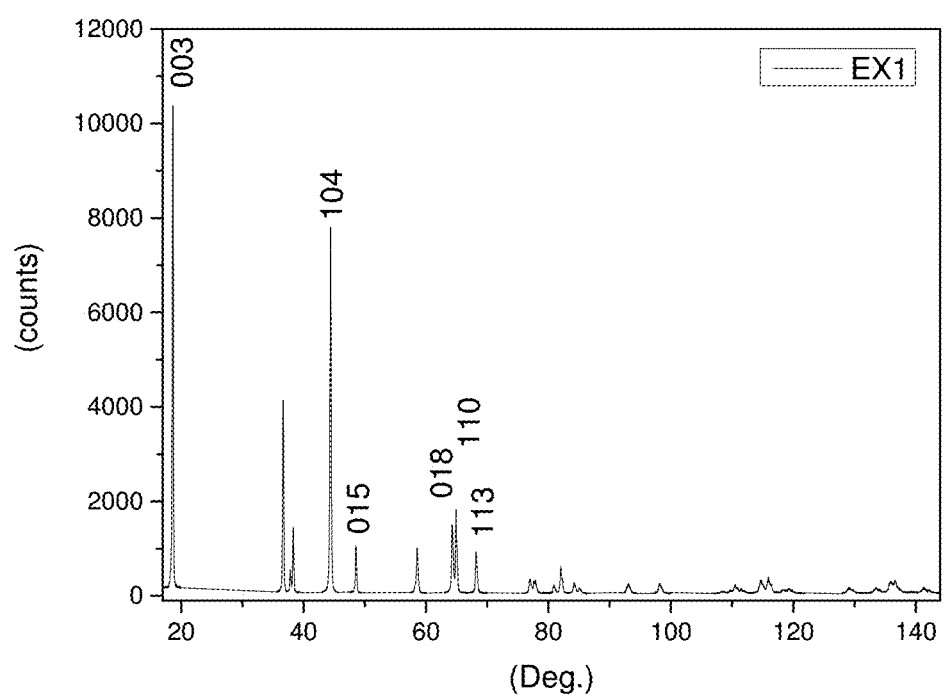
FIG. 14: XRD pattern of Example 1 showing the diffracted intensity (counts) as function of 2-theta (degrees). The positions of 003, 104, 015, 018, 110 and 113 reflections of the α-NaFeO$_2$ cell (space group R-3 m) are indicated.

Careful observation of SEM images (FIG. 5) shows that:
(i) The size of the primary particles is more developed in the case of CEX1 (FIG. 5c) compared to EX1 (FIG. 5a). This is consistent with the increase in the FWHM of the 003, 104, 015, 018, 110 and 118 which is attributed the smaller size of coherent domains hence smaller size of primary particles (Table 7 & FIG. 14-15).
(ii) The density of nanometric voids and pores, typically 10~100 nm in size, is higher inside particles of CEX1 compared to EX1 and EX2. EX1, EX2 and CEX1 have similar BET values near 0.30 m²/g (Table 4). Their true BET are however very different and substantially higher for EX1 and EX2 by about 0.50 m²/g compared to CEX1. Presence of nanometric pores is then also expected in EX1 and EX2 but with a much smaller characteristic size than in CEX1 materials.

It is the author's opinion that the larger crystallinity and the presence of internal porosity and voids with large concentration and large characteristic size, typically exceeding 10 nm in size, are factors enhancing particle fracture and therefore making the particles less resistant to uni-axial stress and more brittle upon electrochemical cycling for CEX1 compared to EX1 and EX2. It is shown in the present invention that internal porosity of the particle can be controlled by process conditions and in this case by lowering the sintering temperature. As shown later in other examples, other suitable parameters include different Li:M ratio and different impurity content such as lithium salt based species that affect the stability of grain boundaries and therefore increase brittleness. For example, excessive amounts of LiOH, $Li_2CO_3$ and $Li_2SO_4$ lead to accumulation of these species at the grain boundaries, destabilization of the grain boundary and eventually increased brittleness. In conclusion, EX1 and EX2 are embodiments of the present invention; CEX1 is a counter example.

EX3, EX4 and CEX2

Figure 6:
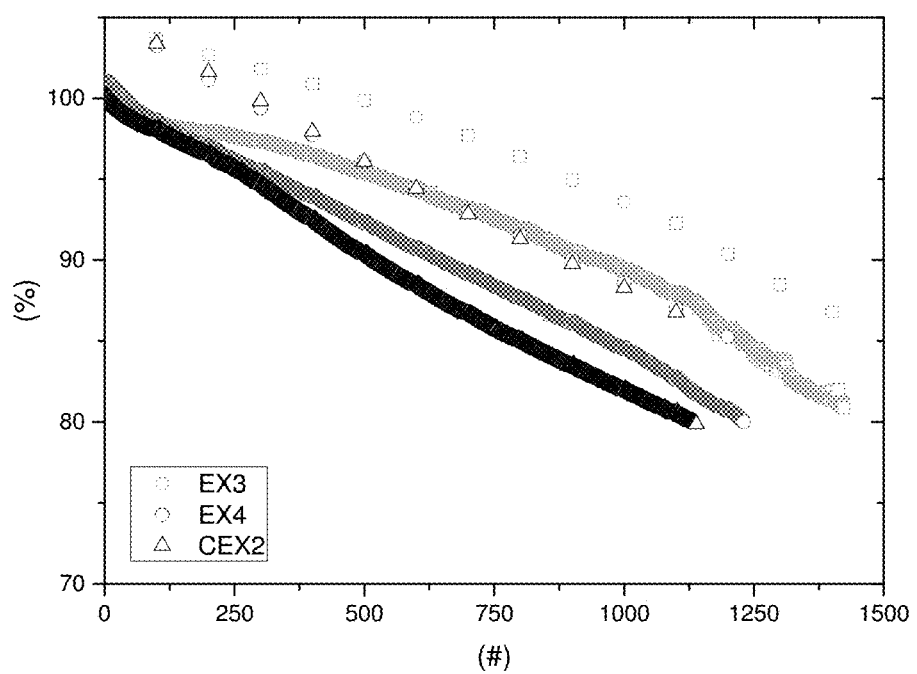
FIG. 6: full cell cycle life at room-temperature of EX3, EX4 and CEX2 when cycled between 4.2 and 2.7V. Evolution of the retained capacity (in % of the initial discharge capacity) as a function of the cycle number (#).
Figure 7:
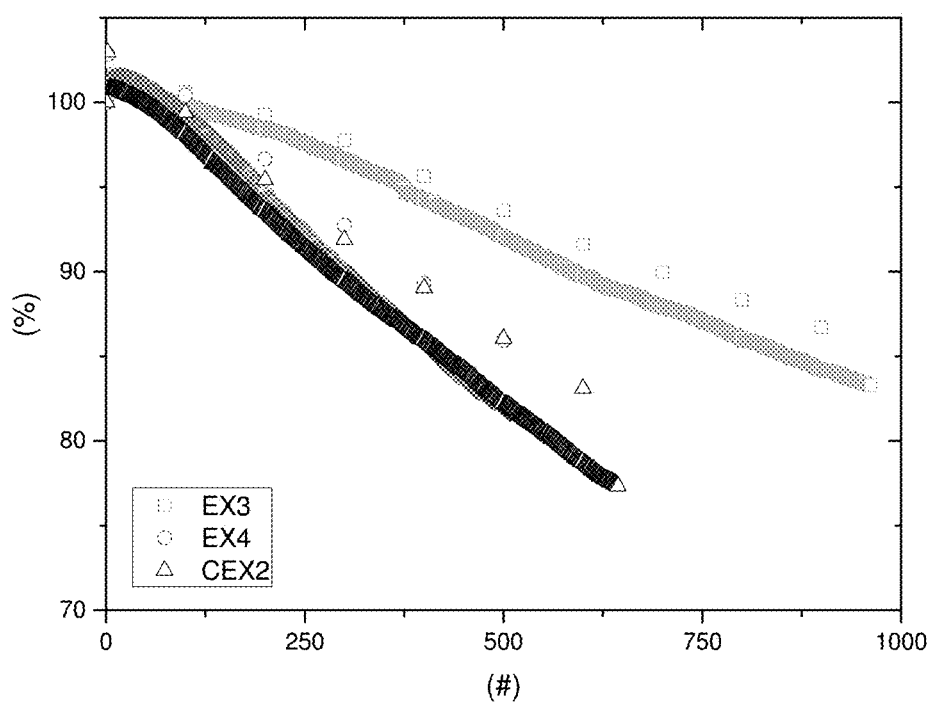
FIG. 7: full cell cycle life at 45° C. of EX3, EX4 and CEX2 when cycled between 4.2 and 2.7V. Evolution of the retained capacity (in % of the initial discharge capacity) as a function of the cycle number (#).
Figure 8:
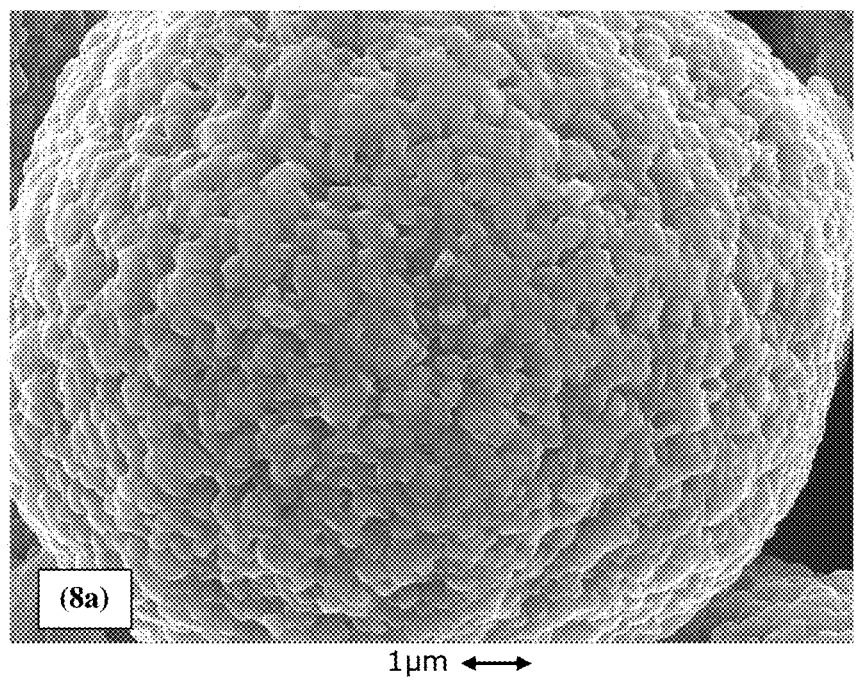
FIG. 8: SEM of secondary particles of Example 3 (top-FIG. 8a) and Counter Example 2 (bottom-FIG. 8b).
Figure 8:
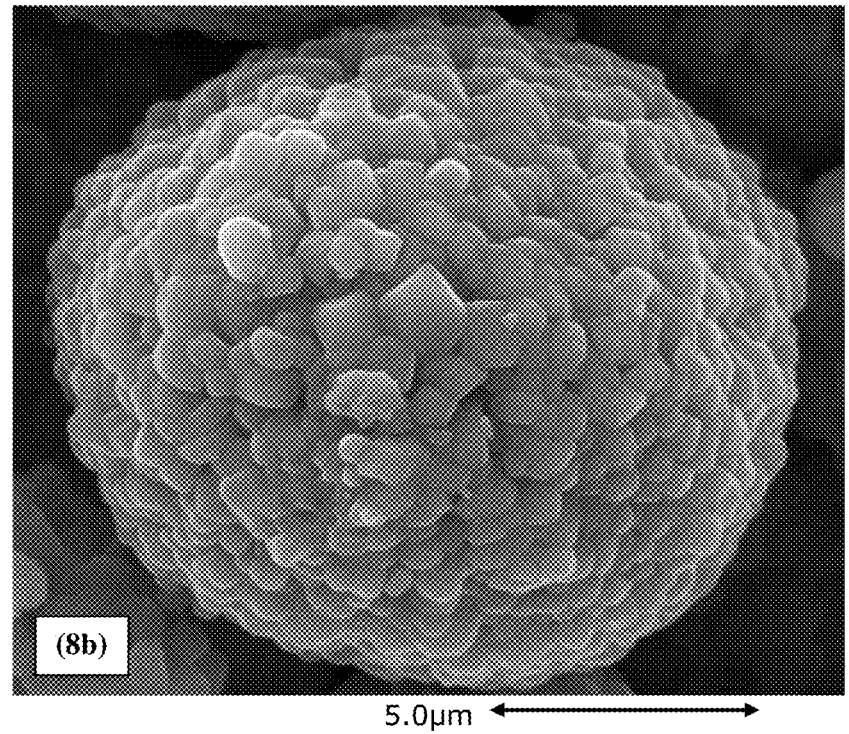
Figure 9:
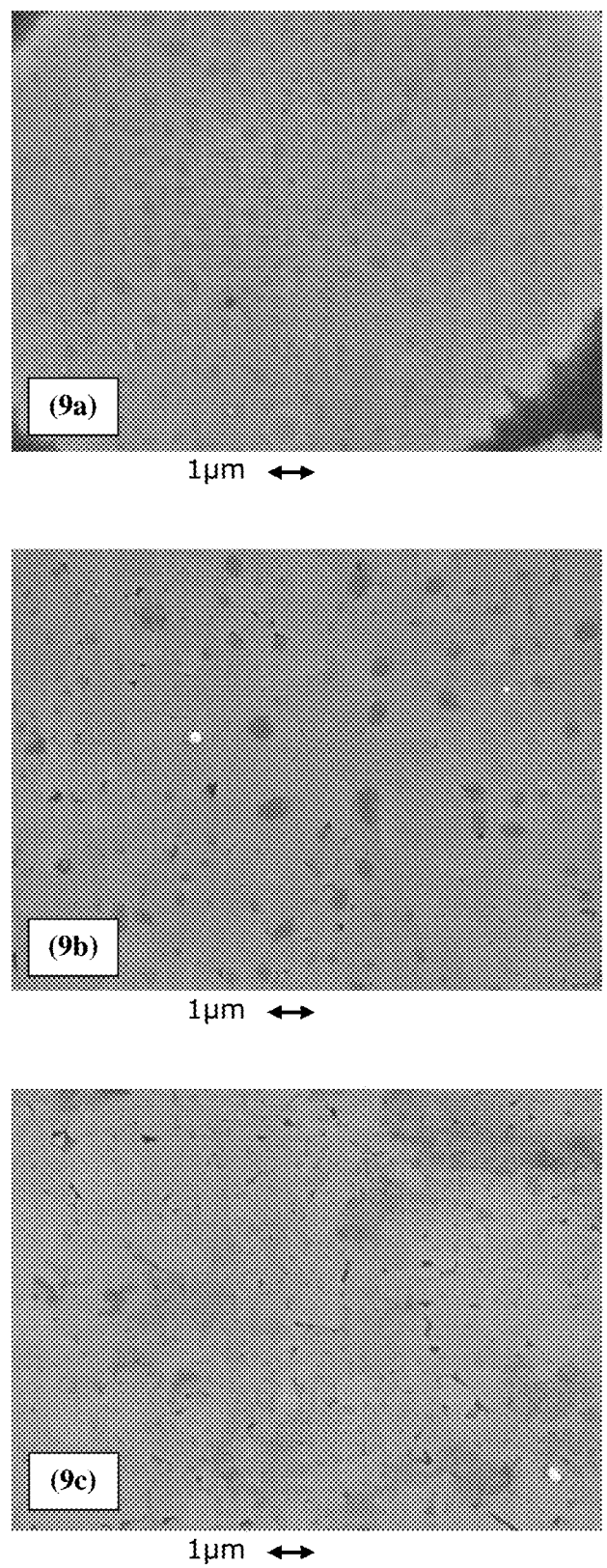
FIG. 9: cross-sectional SEM of secondary particles of Examples 3 (top-FIG. 9a), 4 (middle-FIG. 9b) and Counter Example 2 (bottom-FIG. 9c).

Likewise, EX3, EX4 and CEX2 follow the same relationship between cycle stability and particle brittleness as EX1, EX2 and CEX1: the lower the ΔΓ(P), the better the coin cell and full cell cycle life. In particular, EX3 is superior over 1400 cycles and over 1000 cycles at room temperature and 45° C., respectively (FIG. 6-7). The same inclusion of voids and grain boundary cracks within the particles are observed when the heat treatment temperature increases (FIG. 8-9). EX3, EX4 and CEX2 however differentiate from EX1, EX2 and CEX1 in the larger amount of effective $Ni^{3+}$, being 0.2 in EX1, EX2 and CEX1 and 0.4 in EX3, EX4 and CEX2. This higher $Ni^{3+}$ content results in about 10 mAh/g higher CQ1 and DQ1 values compared to EX1, EX2 and CEX1. Residual LiOH and $Li_2CO_3$ contents are also much increased. In particular, EX1 and EX3 have similar crystallinity as shown by the XRD FWHMs values but particles of EX3 have a propensity to break more than EX1. As a result, coin cell and full cell electrochemical properties of EX3 are inferior to EX1 especially at room temperature. The better cycle life at 45° C. of EX3 compared to EX1 might be explained by different surface chemistry regarding electrolyte oxidation due to the different Ni/Mn/Co composition and is not well understood by the authors; though the improvements over EX4 and CEX2 are believed to be in relation with lower brittleness.

EX5, EX6 and EX7

Figure 10:
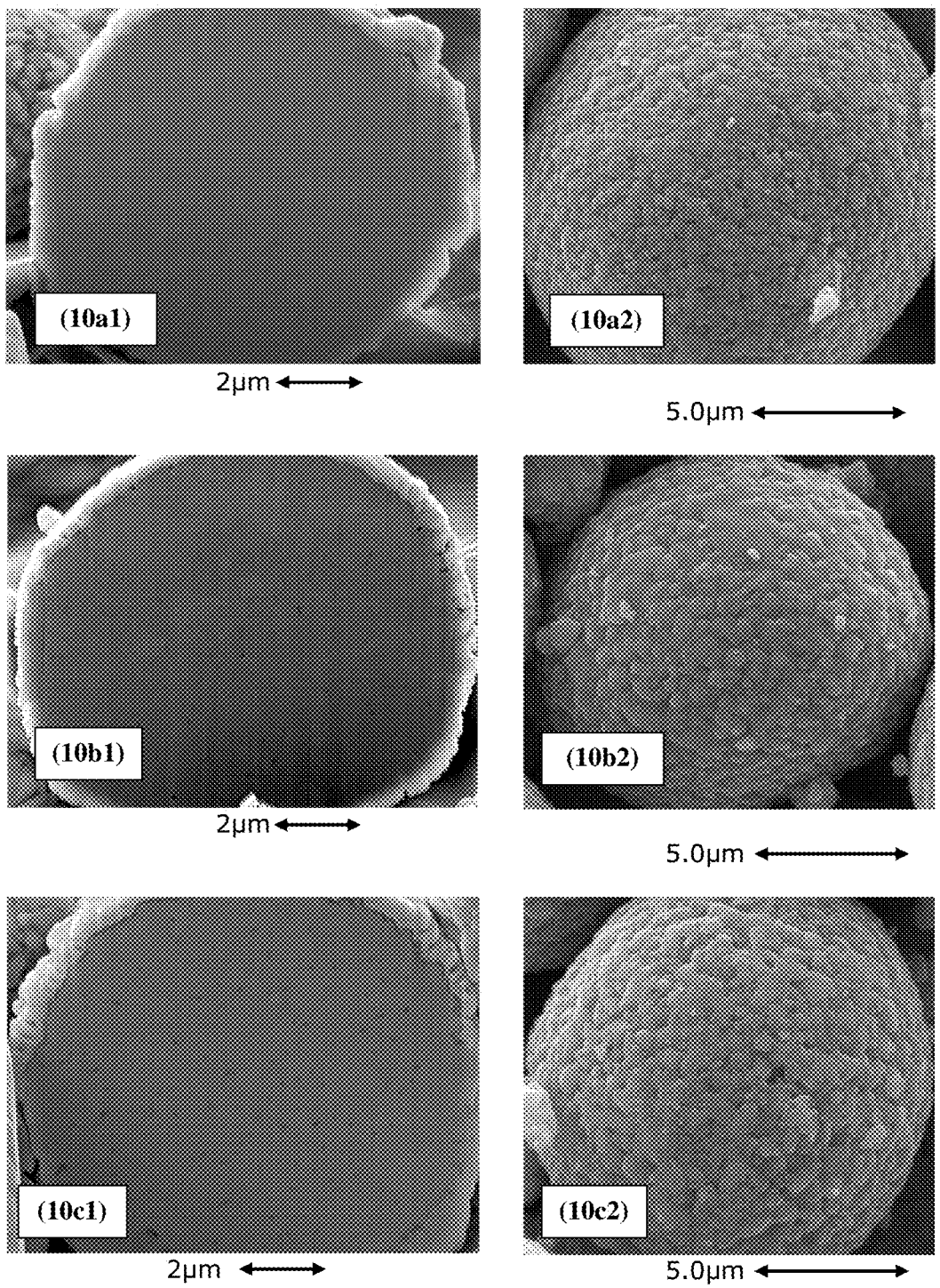
FIG. 10: cross-sectional SEM and SEM of secondary particles of Examples 5 (FIGS. 10a1 and 10a2), 6 (FIGS. 10b1 and 10b2) and Counter Example 7 (FIGS. 10c1 and 10c2).

EX5, EX6 and EX7 differ in their increasing Li:M ratio and as a result differ in many properties. Strictly and as explained in the introduction, the effective $Ni^{3+}$ content increases with Li:M but in the present case the $Ni^{3+}$ content will be considered constant and equal to 0.817. Coin cell evaluation shown that DQ1 increases constantly with Li:M ratio but in the meantime both 0.1 C and 1 C Qfad and Efad are degrading. Note that the 1 C/1 C cycle life at 4.5V does not allow to discriminate products; the depth of charge and discharge, meaning the amount of Li reversibly extracted from the cathode materials being too high, which levels out differences. Residual LiOH and $Li_2CO_3$ contents are also increasing with Li:M. Cross-sectional SEM (FIG. 10) shown that the density and the size of voids within the particles increases with Li:M. XRD FWHM values (Table 7) are also increasing with decreasing Li:M, meaning that crystallinity is decreasing with Li:M.

$\Delta\Gamma(P)$ hardness properties (Table 3) show a more complex behavior: as expected from SEM and XRD, EX5 has the lowest $\Delta\Gamma(P)$ and the best coin cell properties. EX6 and EX7 have larger $\Delta\Gamma(P)$ values than EX5, though being identical. A careful examination of the particle size distribution of EX7 reveals that the <3 µm volume fraction is circa 2% and higher than EX5 and EX6. In fact though all the samples have close D50 between 10~14 µm, EX7 is the only example of this study to feature such high value of <3 µm fraction. The authors believe that these fine particles are created during the post-treatment step of the powder and are evidence of a more brittle character of EX7 over EX6. As a conclusion, the increasing residual base content and the increasing crystallinity with Li:M are resulting in larger particle brittleness for EX5, EX6 and EX7.

EX8, EX9 and EX10

EX8 and EX9 were an attempt to reproduce EX5 and EX6 at pilot scale, respectively, in order to measure full cell properties. Although there exists a systematic offset in properties between EX8 and EX5 and EX9 and EX6, the differences between EX8 and EX9 are in line with the one reported for EX5 and EX6. EX8 shows significant improvements of 0.1 C and 1 C Qfad and Efad coin cell fading compared to EX9 and there again align well with the decrease of $\Delta\Gamma(P)$. Full cell cycle life is similar at room temperature but improved at 45° C. by about 10% more cycles demonstrated for EX8. See FIG. 11-12. Cross-sectional SEM is shown on FIG. 13.

EX10 has a lower Al and Co content compared to EX9 resulting in a higher $Ni^{3+}$ content. The $\Delta\Gamma(P)$ of EX10 is strongly increased over EX9 and the 0.1 C and 1 C Qfad and Efad coin cell and the full cell room temperature and 45° C. cycle stabilities are lowered.

TABLE 1 coin cell evaluation using schedule 1 (4.3-4.5-4.5 V/Li metal).

| | Capacity and rate at 4.3 V | | | | | | Capacity and fading rate at 4.5 V (per 100 cycles) | | | | | | |
|---|---|---|---|---|---|---|---|---|---|---|---|---|---|
| | | | | Rate (per 0.1 C) | | | QD7 | QD8 | | | | | |
| | QC1 | QD1 | Qirr | 1 C | 2 C | 3 C | 0.1 C | 1 C | Capacity fading (%) | | | Energy fading (%) | | |
| Sample | mAh/g | mAh/g | % | (%) | (%) | (%) | mAh/g | mAh/g | 0.1 C | 1 C | 1 C/1 C | 0.1 C | 1 C | 1 C/1 C |
| Ex1 | 190.4 | 166.5 | 12.5 | 91.5 | 87.5 | 84.7 | 192.5 | 177.1 | −2.4 | 1.1 | 18.1 | −0.9 | 4.5 | 24.2 |
| Ex2 | 191.3 | 170.6 | 10.8 | 92.0 | 88.4 | 86.0 | 195.2 | 180.9 | 1.0 | 5.2 | 20.1 | 2.3 | 9.2 | 26.6 |
| CEX1 | 193.5 | 170.4 | 11.9 | 91.7 | 88.0 | 85.6 | 195.2 | 180.0 | 4.8 | 9.5 | 24.1 | 6.3 | 13.9 | 31.3 |
| EX3 | 198.6 | 179.6 | 9.6 | 91.4 | 88.0 | 85.8 | 201.1 | 185.0 | −0.5 | 2.8 | 14.5 | 0.5 | 5.0 | 18.7 |
| EX4 | 200.9 | 178.2 | 11.3 | 92.5 | 89.5 | 87.4 | 199.9 | 185.1 | 4.5 | 9.1 | 20.2 | 5.5 | 11.7 | 25.1 |
| CEX2 | 200.0 | 178.2 | 10.9 | 92.0 | 88.9 | 86.8 | 200.4 | 185.6 | 3.9 | 9.8 | 21.4 | 5.1 | 12.8 | 26.7 |

TABLE 2 coin cell evaluation using schedule 2 (4.3-4.3-4.5 V/Li metal).

| | Capacity and rate at 4.3 V | | | | | | Capacity and fading rate at 4.3 V and 4.5 V (per 100 cycles) | | | | | |
|---|---|---|---|---|---|---|---|---|---|---|---|---|
| | | | | Rate (per 0.1 C) | | | Capacity fading (%) | | | Energy fading (%) | | |
| | QC1 | QD1 | Qirr | 1 C | 2 C | 3 C | | | 1 C/1 C | | | 1 C/1 C |
| Sample | mAh/g | mAh/g | % | (%) | (%) | (%) | 0.1 C | 1 C | (4.5 V) | 0.1 C | 1 C | (4.5 V) |
| EX5 | 221.1 | 188.1 | 14.9 | 92.5 | 89.4 | 86.8 | 2.6 | 7.6 | 22.3 | 3.6 | 9.0 | 27.7 |
| EX6 | 221.3 | 194.7 | 12.0 | 91.7 | 88.9 | 87.4 | 6.3 | 8.8 | 23.6 | 6.5 | 9.4 | 28.6 |
| EX7 | 221.3 | 195.8 | 11.5 | 92.7 | 89.9 | 88.5 | 9.8 | 12.9 | 23.4 | 10.0 | 13.7 | 27.7 |
| EX8 | 220.7 | 190.1 | 13.9 | 91.7 | 88.4 | 85.6 | −3.6 | 2.0 | 21.4 | −2.5 | 3.2 | 26.7 |
| EX9 | 222.5 | 194.7 | 12.5 | 80.2 | 89.6 | 87.6 | 0.7 | 5.9 | 17.8 | 1.5 | 6.8 | 22.4 |
| EX10 | 223.1 | 201.4 | 9.7 | 91.0 | 88.4 | 86.9 | 11.8 | 12.2 | 21.3 | 11.6 | 12.7 | 26.2 |

TABLE 3 brittleness properties.

| Sample | Li:M (1+x)/(1−x) | a | b | Ni³⁺ 1−2a−b (mol %) | ΔΓ(P) P = 200 MPa (%) | ΔΓ(P) P = 300 MPa (%) | (1) (%) | (2) (%) | (3) (%) |
| --- | --- | --- | --- | --- | --- | --- | --- | --- | --- |
| EX1 | 1.010 | 0.3 | 0.2 | 0.200 | 56.4 | 83.7 | 132 | 182 | 145 |
| EX2 | 1.010 | 0.3 | 0.2 | 0.200 | 83.8 | 116.4 | 132 | 182 | 145 |
| CEX1 | 1.010 | 0.3 | 0.2 | 0.200 | 223.4 | 266.4 | 132 | 182 | 145 |
| EX3 | 1.010 | 0.2 | 0.2 | 0.400 | 78.5 | 112.9 | 164 | 214 | 165 |
| EX4 | 1.010 | 0.2 | 0.2 | 0.400 | 122.8 | 184.2 | 164 | 214 | 165 |
| CEX2 | 1.010 | 0.2 | 0.2 | 0.400 | 218.6 | 242.8 | 164 | 214 | 165 |
| EX5 | 0.980 | 0 | 0.183 | 0.817 | 68.4 | 97.4 | 230.72 | 280.72 | 206.7 |
| EX6 | 1.000 | 0 | 0.183 | 0.817 | 98.0 | 137.0 | 230.72 | 280.72 | 206.7 |
| EX7 | 1.020 | 0 | 0.183 | 0.817 | 91.2 | 135.5 | 230.72 | 280.72 | 206.7 |
| EX8 | 0.985 | 0 | 0.183 | 0.817 | 77.9 | 109.4 | 230.72 | 280.72 | 206.7 |
| EX9 | 1.000 | 0 | 0.183 | 0.817 | 130.3 | 168.2 | 230.72 | 280.72 | 206.7 |
| EX10 | 1.000 | 0 | 0.172 | 0.828 | 174.0 | 219.3 | 232.48 | 282.48 | 207.8 |

(1) 100% + (1−2a−b) × 160% for P = 200 MPa
(2) 150% + (1−2a−b) × 160% for P = 300 MPa
(3) 125% + (1−2a−b) × 100% for P = 300 Mpa

TABLE 4 physical properties.

| Sample | LiOH wt % | Li₂CO₃ wt % | S wt % | BET (m²/g) | True BET (m²/g) | Pressed density (g/cm³) | Electrode density (g/cm³) | Density at 300 MPa (g/cm³) |
| --- | --- | --- | --- | --- | --- | --- | --- | --- |
| EX1 | 0.12 | 0.06 | 0.1149 | 0.30 | 1.29 | 3.21 | 3.19 | 3.35 |
| EX2 | 0.12 | 0.09 | 0.1129 | 0.37 | 1.49 | — | 3.21 | 3.44 |
| CEX1 | 0.08 | 0.06 | 0.1123 | 0.28 | 0.93 | 3.28 | 3.19 | 3.61 |
| EX3 | 0.33 | 0.16 | 0.1188 | 0.25 | — | 3.28 | 3.36 | 3.45 |
| EX4 | 0.20 | 0.17 | 0.1179 | 0.32 | — | 3.40 | 3.30 | 3.50 |
| CEX2 | 0.22 | 0.17 | 0.1497 | — | — | 3.25 | 3.28 | 3.57 |
| EX5 | 0.38 | 0.21 | 0.0517 | 0.28 | 2.15 | — | — | 3.50 |
| EX6 | 0.46 | 0.30 | 0.0499 | 0.30 | 2.21 | — | — | 3.58 |
| EX7 | 0.52 | 0.44 | 0.0491 | 0.34 | 2.51 | — | — | 3.56 |
| EX8 | 0.35 | 0.24 | 0.0508 | 0.24 | 1.76 | 3.40 | 3.41 | 3.49 |
| EX9 | 0.37 | 0.24 | 0.0497 | 0.23 | 1.93 | 3.40 | 3.47 | 3.50 |
| EX10 | 0.25 | 0.20 | 0.0503 | 0.28 | — | 3.46 | 3.51 | 3.84 |

TABLE 5 number of cycles to reach 80% retained capacity in full cell at room temperature and 45° C.

| Sample | RT cycle number | 45° C. cycle number |
| --- | --- | --- |
| EX1 | >2000 | 816 |
| EX2 | 1075 | 735 |
| CEX1 | 938 | 614 |
| EX3 | 1450 | >1000 |
| EX4 | 1230 | 567 |
| CEX2 | 1139 | 567 |
| EX5 | — | — |
| EX6 | — | — |
| EX7 | — | — |
| EX8 | 1658 | 453 |
| EX9 | 1681 | 409 |
| EX10 | 1024 | 329 |

TABLE 6

Particle size distribution.

| Sample | Volume fraction <1 μm (%) | Volume fraction <3 μm (%) | D10 (μm) | D50 (μm) | D90 (μm) | D99 (μm) | D100 (μm) |
| --- | --- | --- | --- | --- | --- | --- | --- |
| EX1 | 0.0 | 0.0 | 5.6 | 9.9 | 17.4 | 24.6 | 32.3 |
| EX2 | 0.0 | 0.0 | 5.6 | 10.0 | 17.6 | 25.2 | 33.3 |
| CEX1 | 0.0 | 0.0 | 7.1 | 12.4 | 21.5 | 30.3 | 38.2 |
| EX3 | 0.0 | 0.0 | 6.4 | 11.7 | 20.6 | 29.2 | 38.5 |
| EX4 | 0.0 | 0.0 | 7.3 | 12.8 | 21.9 | 30.6 | 38.1 |
| CEX2 | 0.0 | 0.0 | 8.1 | 14.4 | 24.9 | 34.8 | 45.1 |
| EX5 | 0.0 | 0.0 | 6.9 | 12.4 | 22.0 | 31.4 | 38.7 |
| EX6 | 0.0 | 0.0 | 7.2 | 13.0 | 22.9 | 32.8 | 42.7 |
| EX7 | 0.6 | 2.0 | 6.9 | 12.8 | 22.6 | 32.2 | 38.8 |
| EX8 | 0.0 | 0.0 | 7.1 | 12.9 | 22.7 | 32.4 | 39.6 |
| EX9 | 0.0 | 0.0 | 7.6 | 13.2 | 22.9 | 32.4 | 39.7 |
| EX10 | 0.0 | 0.0 | 7.7 | 13.6 | 23.7 | 33.4 | 42.7 |

TABLE 7

FWHM and 2-theta position of 003, 104, 015, 018, 110 and 113 peaks. Units are 2-theta degrees.

| Sample | 2θ 003 | FWHM 003 | 2θ 104 | FWHM 104 | 2θ 015 | FWHM 015 | 2θ 018 | FWHM 018 | 2θ 110 | FWHM 110 | 2θ 113 | FWHM 113 |
|---|---|---|---|---|---|---|---|---|---|---|---|---|
| EX1  | 18.63 | 0.146 | 44.38 | 0.175 | 48.53 | 0.173 | 64.26 | 0.209 | 64.89 | 0.183 | 68.18 | 0.206 |
| EX2  | 18.65 | 0.140 | 44.40 | 0.165 | 48.55 | 0.162 | 64.28 | 0.206 | 64.92 | 0.174 | 68.21 | 0.196 |
| CEX1 | 18.65 | 0.134 | 44.39 | 0.148 | 48.55 | 0.141 | 64.28 | 0.178 | 64.90 | 0.161 | 68.19 | 0.171 |
| EX3  | 18.69 | 0.192 | 44.45 | 0.180 | 48.62 | 0.171 | 64.39 | 0.212 | 64.98 | 0.198 | 68.28 | 0.217 |
| EX4  | 18.67 | 0.140 | 44.44 | 0.163 | 48.61 | 0.154 | 64.38 | 0.196 | 64.98 | 0.174 | 68.27 | 0.190 |
| CEX2 | 18.68 | 0.136 | 44.44 | 0.155 | 48.61 | 0.150 | 64.38 | 0.191 | 64.97 | 0.170 | 68.26 | 0.186 |
| EX5  | 18.72 | 0.140 | 44.49 | 0.158 | 48.67 | 0.142 | 64.51 | 0.190 | 64.99 | 0.186 | 68.30 | 0.188 |
| EX6  | 18.73 | 0.136 | 44.50 | 0.149 | 48.69 | 0.137 | 64.53 | 0.164 | 65.00 | 0.165 | 68.32 | 0.175 |
| EX7  | 18.73 | 0.136 | 44.51 | 0.144 | 48.69 | 0.132 | 64.54 | 0.155 | 65.02 | 0.156 | 68.34 | 0.162 |
| EX8  | 18.71 | 0.141 | 44.49 | 0.160 | 48.67 | 0.150 | 64.50 | 0.191 | 65.00 | 0.189 | 68.31 | 0.195 |
| EX9  | 18.73 | 0.138 | 44.51 | 0.156 | 48.69 | 0.146 | 64.53 | 0.181 | 65.03 | 0.174 | 68.34 | 0.184 |
| EX10 | 18.71 | 0.131 | 44.47 | 0.154 | 48.66 | 0.143 | 64.50 | 0.179 | 64.96 | 0.170 | 68.28 | 0.172 |

TABLE 8 coin cell schedule 1 used to evaluate EX1, EX2, EX3, EX4, CEX1 and CEX2. 1 C definition is 160 mA/g.

| Type | Cycle number "n" | Charge C Rate | Charge End Current | Charge Rest (min) | Charge V/Li metal (V) | Discharge C Rate | Discharge End Current | Discharge Rest (min) | Discharge V/Li metal (V) |
|---|---|---|---|---|---|---|---|---|---|
| Part I: Rate performance | 1 | 0.10 | — | 30 | 4.3 | 0.10 | — | 30 | 3.0 |
|  | 2 | 0.25 | 0.05 C | 10 | 4.3 | 0.20 | — | 10 | 3.0 |
|  | 3 | 0.25 | 0.05 C | 10 | 4.3 | 0.50 | — | 10 | 3.0 |
|  | 4 | 0.25 | 0.05 C | 10 | 4.3 | 1.00 | — | 10 | 3.0 |
|  | 5 | 0.25 | 0.05 C | 10 | 4.3 | 2.00 | — | 10 | 3.0 |
|  | 6 | 0.25 | 0.05 C | 10 | 4.3 | 3.00 | — | 10 | 3.0 |
| Part II: 1 C cycle life | 7 | 0.25 | 0.1 C | 10 | 4.5 | 0.10 | — | 10 | 3.0 |
|  | 8 | 0.25 | 0.1 C | 10 | 4.5 | 1.00 | — | 10 | 3.0 |
|  | 9~33 | 0.50 | 0.1 C | 10 | 4.5 | 1.00 | — | 10 | 3.0 |
|  | 34 | 0.25 | 0.1 C | 10 | 4.5 | 0.10 | — | 10 | 3.0 |
|  | 35 | 0.25 | 0.1 C | 10 | 4.5 | 1.00 | — | 10 | 3.0 |
| Part III: 1 C/1 C cycle life | 36~60 | 1.00 | — | 10 | 4.5 | 1.00 | — | 10 | 3.0 |

TABLE 9 coin cell schedule 2 used to evaluate EX5, EX6, EX7, EX8, EX9 and EX10. 1 C definition is 160 mA/g.

| Type | Cycle number "n" | Charge C Rate | Charge End Current | Charge Rest (min) | Charge V/Li metal (V) | Discharge C Rate | Discharge End Current | Discharge Rest (min) | Discharge V/Li metal (V) |
|---|---|---|---|---|---|---|---|---|---|
| Part I: Rate performance | 1 | 0.10 | — | 30 | 4.3 | 0.10 | — | 30 | 3.0 |
|  | 2 | 0.25 | 0.05 C | 10 | 4.3 | 0.20 | — | 10 | 3.0 |
|  | 3 | 0.25 | 0.05 C | 10 | 4.3 | 0.50 | — | 10 | 3.0 |
|  | 4 | 0.25 | 0.05 C | 10 | 4.3 | 1.00 | — | 10 | 3.0 |
|  | 5 | 0.25 | 0.05 C | 10 | 4.3 | 2.00 | — | 10 | 3.0 |
|  | 6 | 0.25 | 0.05 C | 10 | 4.3 | 3.00 | — | 10 | 3.0 |
| Part II: 1 C cycle life | 7 | 0.25 | 0.1 C | 10 | 4.3 | 0.10 | — | 10 | 3.0 |
|  | 8 | 0.25 | 0.1 C | 10 | 4.3 | 1.00 | — | 10 | 3.0 |
|  | 9~33 | 0.50 | 0.1 C | 10 | 4.3 | 1.00 | — | 10 | 3.0 |
|  | 34 | 0.25 | 0.1 C | 10 | 4.3 | 0.10 | — | 10 | 3.0 |
|  | 35 | 0.25 | 0.1 C | 10 | 4.3 | 1.00 | — | 10 | 3.0 |
| Part III: 1 C/1 C cycle life | 36~60 | 1.00 | — | 10 | 4.5 | 1.00 | — | 10 | 3.0 |

TABLE 10 physical properties of EX11 to EX15.

| Sample | D50 (μm) | D99 (μm) | D100 (μm) | wt % oversize (wt %) | BET (m²/g) |
|---|---|---|---|---|---|
| EX11 | 18.1 | 544.2 | 799.5 | 60.7% | 0.250 |
| EX12 | 12.4 | 31.2 | 38.7 | 9.0% | 0.299 |
| EX13 | 12.1 | 30.0 | 38.2 | 6.2% | 0.294 |
| EX14 | 10.9 | 26.5 | 33.1 | 4.4% | 0.343 |
| EX15 | 10.2 | 23.9 | 32.0 | 0.0% | 0.821 |

The invention claimed is:

1. A powderous positive electrode material for a lithium secondary battery, the powderous positive electrode material having the general formula $Li_{1+x}[Ni_{1-a-b-c}M_aM'_bM''_c]_{1-x}O_{2-z}$;

M being either one or more elements selected from the group consisting of Mn, Zr and Ti, M' being either one or more elements selected from the group consisting of Al, B and Co, M" being a dopant different from M and M', x, a, b and c being expressed in mol with $-0.02 \leq x \leq 0.02$, $0 \leq c \leq 0.05$, $0.10 \leq (a+b) \leq 0.65$ and $0 \leq z \leq 0.05$; and wherein the powderous positive electrode material is characterized by having a BET value $\leq 0.37$ m²/g, a $D_{max} < 50$ μm, and a hardness strength index $\Delta \Gamma(P)$ of no more than $100\% + (1-2a-b) \times 160\%$ for P=200 MPa, wherein $$\Delta \Gamma(P) = \frac{\Gamma^P(D10_{P=0}) - \Gamma^0(D10_{P=0})}{\Gamma^0(D10_{P=0})} \times 100 \text{ (in \%)}$$

with $D10_{P=0}$ being the D10 value of an unconstrained powder (P=0 MPa), $\Gamma^0(D10_{P=0})$ being a cumulative volume particle size distribution of the unconstrained powder at $D10_{P=0}$, and $\Gamma^P(D10_{P=0})$ being the cumulative volume particle size distribution at $D10_{P=0}$ of pressed samples with P being expressed in MPa.

2. The powderous positive electrode material of claim 1, wherein M=Mn and M' is one of Al or Co.

3. The powderous positive electrode material of claim 1, wherein $\Delta \Gamma(P) \leq 150\% + (1-2a-b) \times 160\%$ for P=300 MPa.

4. The powderous positive electrode material of claim 1, wherein $\Delta \Gamma(P) \leq 125\% + (1-2a-b) \times 100\%$ for P=300 MPa.

5. The powderous positive electrode material of claim 1, wherein either:

$\Delta \Gamma(P) \leq 180\%$ for P=300 MPa, or $\Delta \Gamma(P) \leq 140\%$ for P=300 MPa, or $\Delta \Gamma(P) \leq 100\%$ for P=300 MPa.

6. The powderous positive electrode material of claim 1, wherein $1-a-b \geq 0.5$ and $1+x < 1$.

7. The powderous positive electrode material of claim 1, having a BET value after wash $> 1$ m²/g.

8. The powderous positive electrode material of claim 1, having a pressed density greater than 3.0 g/cm³.

9. The powderous positive electrode material of claim 1, comprising up to 2 mol % of W, Mo, Nb, Zr, or a rare earth element.

10. The powderous positive electrode material of claim 1, having a soluble base content $(Li_2CO_3+LiOH) < 0.8$ wt %.

11. The powderous positive electrode material of claim 1, comprising secondary particles substantially free from porosities larger than 20 nm.

12. The powderous positive electrode material of claim 1, comprising secondary particles containing less than 20 voids larger than 20 nm.

13. The powderous positive electrode material of claim 1, having a FWHM value of the (104) peak as defined by the pseudo hexagonal lattice with R-3 m space group which is greater than 0.125 2-theta degrees.

14. The powderous positive electrode material of claim 1, having a FWHM value of the (015) peak as defined by the pseudo hexagonal lattice with R-3 m space group which is greater than 0.125 2-theta degrees.

15. The powderous positive electrode material of claim 1, having a FWHM value of the (113) peak as defined by the pseudo hexagonal lattice with R-3 m space group which is greater than 0.16 2-theta degrees.

16. The powderous positive electrode material of claim 1, having a second phase $LiN_{x'}O_{y'}$ with $0 < x' < 1$ and $0 < y' < 2$, where N is selected from the group consisting of either one or more of W, Mo, Nb, Zr and rare earth elements.

17. A method for preparing the powderous positive electrode material according to claim 1, the material having the general formula $Li_{1+x}[Ni_{1-a-b-c}M_aM'_bM''_c]_{1-x}O_{2-z}$, the method comprising:

providing a mixture of one or more precursor materials comprising either one or more of Ni, M, M' or M", and a precursor material comprising Li, sintering the mixture at a temperature T expressed in °C., with $(945-(248*(1-2a-b)) \leq T \leq (985-(248*(1-2a-b)))$, thereby obtaining agglomerated particles, and pulverizing the agglomerated particles whereby a powder is obtained having a BET $\leq 0.37$ m²/g and a $D_{max} < 50$ μm.

* * * * *